(12) United States Patent
Aoki et al.

(10) Patent No.: US 7,127,252 B1
(45) Date of Patent: Oct. 24, 2006

(54) RADIO TERMINAL EQUIPMENT

(75) Inventors: Nobuhisa Aoki, Kawasaki (JP);
Makoto Uchishima, Kawasaki (JP);
Hiroaki Iwamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/510,074

(22) Filed: Feb. 22, 2000

(30) Foreign Application Priority Data

Apr. 30, 1999 (JP) .................................. 11-124398

(51) Int. Cl.
H04B 17/00 (2006.01)
H04B 15/00 (2006.01)
H04B 7/00 (2006.01)
H04Q 7/20 (2006.01)

(52) U.S. Cl. ..................... 455/442; 455/69; 455/522; 455/504; 455/524; 455/65; 455/67.11; 455/67.7; 455/63; 455/436; 455/437; 455/443

(58) Field of Classification Search ................ 455/69, 455/522, 504, 524, 65, 67.1, 67.7, 63, 436, 455/437, 442, 443, 67.11
See application file for complete search history.

(56) References Cited

U.S. PATENT DOCUMENTS 5,267,261 A * 11/1993 Blakeney et al. ........... 370/332
5,822,318 A * 10/1998 Tiedemann et al. ..... 379/201.07
5,845,212 A * 12/1998 Tanaka ....................... 455/437
5,864,547 A * 1/1999 Strodtbeck et al. ......... 370/318
5,873,028 A * 2/1999 Nakano et al. ............... 455/69
6,400,929 B1 * 6/2002 Ue et al. ...................... 455/69
6,445,684 B1 * 9/2002 Schwengler et al. ........ 370/311
6,603,751 B1 * 8/2003 Odenwalder ................ 370/331

FOREIGN PATENT DOCUMENTS

EP 0 577 322 1/1994
EP 0 899 981 3/1999
WO WO 97/01227 1/1997

OTHER PUBLICATIONS

European Search Report dated Sep. 30, 2004.

* cited by examiner

Primary Examiner—Matthew Anderson
Assistant Examiner—Yuwen Pan
(74) Attorney, Agent, or Firm—Katten Muchin Rosenman LLP

(57) ABSTRACT

The object of a radio terminal equipment is to achieve a highly accurate channel control and a favorable transmission quality. In order to achieve the object, in the radio terminal equipment, a channel controlling means is given in advance a period which accordingly makes both the processing and processing to be done to a transmission wave(s) by a radio station connected through a radio transmission line have lengths of time needed for the processes suitable for channel controlling and which is also suitable for a transmission system in a radio transmission line, and makes a radio wave received by a receiving means during the period the object of the processing. Therefore, a radio transmission system having the present invention applied adapts flexibly to various multiple access systems and modulation systems, and stably maintains the transmission quality of channels high, without having drastic restrictions on the configuration.

45 Claims, 13 Drawing Sheets

FIG. 6

| PROCESSING IDENTIFIER $ID_P$ | COEFFICIENT $\Delta t$ | CONTROLLED OBJECT IDENTIFIER $id_C$ | RESTRICTION PERIOD INFORMATION $id_P$ |
|---|---|---|---|
| ... | ... | ... | ... |

62A, 62B

RADIO TERMINAL EQUIPMENT

BACKGROUND OF THE INVENTION

1. Field of the Invention

The present invention relates, in a radio transmission system, to a radio terminal equipment for receiving radio waves concurrently reached from a plurality of radio stations to process the radio waves under a procedure of channel controls.

2. Description of the Related Art

The CDMA (Code Division Multiple Access) system is a multiple access system which essentially has confidentiality and an interference resistibility, and is capable of suppressing a cochannel interference and reusing a radio frequency efficiently. In addition, the CDMA system is positively being applied to a mobile communication system recently due to the fact that the establishment of technology for realizing the transmitting power control with high accuracy and high response has enabled flexible control of the radio transmission characteristics by the sector zone.

FIG. 9 is a diagram showing an example of a configuration example of a mobile communication system to which the CDMA system is applied.

In FIG. 9, two radio base stations (BTS) 71-1 and 71-2 are connected through a not-shown communication link to form wireless zones 72-1 and 72-2, respectively. A mobile station (MS) 73-1 is located in the overlapping region of the wireless zones 72-1 and 72-2, and mobile stations (MS) 73-2 to 73-4 are located in the region of the wireless zone 72-2, where the wireless zone 72-1 is not overlapped.

FIG. 10 is a diagram showing a configuration of the mobile station.

In FIG. 10, the mobile station 73-1 is composed of: an antenna 81-1; an antenna interface part 82-1 having an antenna terminal connected with the feeding point of the antenna 81-1; a transmission information generating part 83-1 fed with the "upward transmission information" to be transmitted to the radio base stations 71-1 and 71-2; a spreading part 84-1, an orthogonal modulation part 85-1 and a transmission part 86-1 connected in tandem between the output of the transmission information generating part 83-1 and the input of the antenna interface part 82-1; a receiving part 87-1, an orthogonal demodulation part 88-1 and a despreading part 89-1 connected in tandem with the output of the antenna interface part 82-1; a demodulating part 90-1 disposed at a subsequent stage of the despreading part 89-1 for outputting downward transmission information; a receiving timing detecting part (RTDP)91-1 connected together with the despreading part 89-1 directly with the output of the orthogonal demodulation part 88-1; a CDMA controlling part 92-1 connected in tandem with the receiving timing detecting part 91-1 and having one output connected with one control input of the spreading part 84-1; and a receiving signal processing part 93-1 having: a first input connected with the control input of the despreading part 89-1 and the other output of the CDMA controlling part 92-1; second and third inputs connected with the outputs of the despreading part 89-1 and the demodulating part 90-1, respectively; a fourth input connected with the input of the CDMA controlling part 92-1 and the output of the receiving timing detecting part 91-1; and four outputs connected individually with the control inputs of the transmission information generating part 83-1, the orthogonal modulation part 85-1 and the transmission part 86-1 and the other control input of the spreading part 84-1.

Here, the configurations of the mobile stations 73-2 to 73-4 are identical to that of the mobile station 73-1. In the following, therefore, the corresponding components will be designated to the common reference numerals subscribed by the suffixes "2" to "4", and their description and illustration will be omitted.

In the mobile communication system thus configured, the radio base stations 71-1 and 71-2 transmit the transmission wave signals P1 and P2, as modulated in the series of the following frames (hereinafter referred to as the "downward frames"), as shown in FIG. 11(1) and (2), individually to specific radio channels:

Frames containing not only frame numbers SFN having values to be sequentially updated recyclically to "0", "1", - - - , "36863", "8", - - - but also broadcasting information and other control information to be applied for the channel control; and Frames having a constant word length.

Here, the aforementioned word length is assumed to be 10 milliseconds (as will be expressed by the "frame length TF") under a predetermined transmission speed.

In the following, on the other hand, the aforementioned transmission wave signals P1 and P2 and specific radio channels will be called the "broadcasting signal" and the "control channel", respectively.

It is further assumed for simplicity that the "broadcasting signal" be transmitted with a specific transmission power by the radio base stations 71-1 and 71-2 but not an object of the later-described transmission power control.

Moreover, it will be assumed for simplicity that the aforementioned specific radio channel be the "perch channel" which is acquired either by the mobile stations located at the wireless zones 72-1 and 72-2 on the basis of the procedure prescribed for the system or as the information contained in the broadcasting signal.

In the mobile station 73-1, on the other hand, even for the period for which a completed call of the local station remain existing and for which speech signals or the like are transmitted/received through any radio channel formed between the mobile station 73-1 and the radio base station 71-1, for example, the receiving part 87-1 transforms the broadcasting signal P2 (FIG. 11(3)) having reached to the antenna 81-1 from the radio base station 71-2 and given through the antenna interface part 82-1 into a predetermined intermediate frequency signal.

Here, the associated operations of the individual parts concerned with the aforementioned transmission/reception of the speech signal have no relation to the invention, and their detailed description will be omitted.

The orthogonal demodulation part 88-1 generates two baseband signals orthogonal in the baseband region by demodulating the intermediate frequency signal orthogonally. The despreading part 89-1 despreads those baseband signals in accordance with a predetermined despreading code. The demodulating part 90-1 recovers the "downward transmission information" by demodulating the signal, which has been despread to the transmission band in the despreading procedure. On the other hand, the receiving timing detecting part 91-1 reproduces the aforementioned frame series.

The receiving signal processing part 93-1 synchronizes with the frames contained in that "downward transmission information" and extracts the frame numbers SFN contained individually in those frames. Moreover, the receiving signal processing part 93-1 calculates the difference between the current time and the time at which the SFN is at "0", based on the frame numbers SFN thus extracted, and acquires and holds the point t0 of the beginning of a frame having the SFN "0".

On the other hand, the CDMA controlling part 92-1 leads the channel controlling processing to control the operations of the despreading part 89-1 and the spreading part 84-1 under the channeling control and to control the operations of the transmission information generating part 83-1, the spreading part 84-1, the orthogonal modulation part 85-1 and the transmission part 86-1 in association with the receiving signal processing part 93-1.

Of the items relating to such channel control, here will be omitted the description of the item having no relation to the invention.

Further, the processings to be done in the transmission information generating part 83-1, the spreading part 84, the orthogonal modulation part 85-1 and the transmission part 86-1 are individually reversible ones with respect to the aforementioned processings which are done in the demodulating part 90-1, the despreading part 89-1, the orthogonal demodulation part 88-1 and the receiving part 87-1, and their detailed description will be omitted.

The CDMA controlling part 92-1 suitably transmits a transmission signal TX1 modulated with the series of the frame (hereinafter referred to as the "upward frames") containing a later-described timing compensation value TDHO, as shown in FIG. 11(4), for the period while the local station is located in the region where the wireless zone 72-1 and the wireless zone 72-2 overlap and while the aforementioned completed call exists.

Here, the timing compensation value TDHO is given by the following formula for a point tt, at which the transmission of the frames containing the SFN "0" as the aforementioned transmission signal TX1 is started, and the aforementioned point t0:

$$TDHO = tt - t0.$$

Here, the detail of the processing for the CDMA controlling part 92-1 to decide the instant at which such transmission signal TX1 is to be transmitted is omitted for simplicity and will be described hereinafter.

Further, the aforementioned downward frames and upward frames are configured, actually, as a series of time slots in a manner that the corresponding frame is divided into sixteen according to a predetermined form, as shown in FIG. 12. Here in the following, the individual time slots composing the downward frame will be called the "downward slots", and the individual time slots composing the upward frame will be called the "upward slots".

Here, the timing compensation value TDHO, as expressed by the aforementioned formula, signifies "the phase difference between the broadcasting signal P2 having reached the mobile station 73-1 from the radio base station 71-2 and the aforementioned transmission signal TX1" on a time axis.

Therefore, the phase difference that is the sum between the phase difference, corresponding to the difference propagation between a delay time D1 of the radio transmission line from the radio base station 71-2 to the mobile station 73-1 and a delay time D2 of the radio transmission line from the radio base station 71-2 to that mobile station 73-1, and the phase difference of the transmission waves of the radio base stations 71-1 and 71-2 is given by the following formula, when a difference d of the phases on the time axis of the frames to be transmitted in an up link (leading from the mobile station 73-1 to the radio base stations 71-1 and 71-2) and a down link (leading from the radio base stations 71-1 and 71-2 to the mobile station 73-1) on those radio transmission lines is known:

$$\delta = TDHO - d.$$

Here, it is assumed for simplicity that the aforementioned phase difference d be at a value of "1,024" times of the chip rate.

The radio base station 71-1 receives the aforementioned transmission signal TX1, and extracts, the timing compensation value TDHO contained in the transmission signal TX1, for the period while the soft hand-over is to be performed on the corresponding completed call, to inform the radio base station 71-2 the timing compensation value TDHO (containing the corresponding call identification information) through the aforementioned communication link.

For the call which is given such timing compensation value TDHO through the communication link, the radio base station 71-2 maintains the orthogonality of the spreading code to be applied for transmitting, by round the deviation of the phase signified by that timing compensation value TDHO, in the accuracy of the unit period of the symbol. Moreover, the radio base station 71-2 sets, at a point in time when the aforementioned phase difference δ is suppressed in the accuracy of the timing compensation value tDHO (nearly equal to TDHO) obtained as a result of the rounding, the phase (or a point in time at which the transmission is to be started) of the frames to be subsequently sent to the radio channel to be applied for the soft hand-over.

Therefore, to the mobile station 73-1, frames (or time slots) of the speech signal reach almost concurrently from the two radio base stations 71-1 and 71-2 in with a deviation less than the aforementioned symbol period on the time axis as shown in FIGS. 13 (1) and (2).

In the mobile station 73-1, the receiving part 87-1, the orthogonal demodulation part 88-1, the despreading part 89-1, the demodulation part 90-1 and the receiving signal processing part 93-1 receive the frames that concurrently reach in parallel under the control of the CDMA controlling part 92-1.

In the mobile station 73-1, the receiving timing detecting part 91-1 detects the field strength level of the downward slots, which are received from the radio base stations 71-1 and 71-2, as described above, and decides the specific reference point according to a predetermined algorithm. The CDMA controlling part 92-1 specifies the point in time, which is determined relative to the reference point, as the transmission point.

Here, the procedure and an operand of the operations to be done for thus determining the transmission point are not the feature of the invention, and a variety of known techniques can be applied thereto so that their description will be omitted.

Moreover, the CDMA controlling part 92-1 starts, in association with the receiving signal processing part 93-1 and the spreading part 84-1, the transmissions of the upward slots (or frames) containing both or either of the speech signals to be transmitted to the radio base station 71-1 and 71-2 and any control information concerned with channel control of the corresponding call, at that transmission point, and feeds the transmission part 86-1 with the level suited for the value of the TPC bit contained in any downward slot (or frame) received in advance, thereby to control the transmission power necessary for solving the near-far problem intrinsic to the CDMA system.

Here in the aforementioned prior art, the transmission characteristics of the radio transmission line to be formed between the radio base stations 71-1 and 71-2 and the mobile station 73-1 generally vary every moment in accordance with the movement of the mobile station 73-1 and the location and the shape of the landform and planimetry intervening on the radio transmission line, and a multipath is formed. Nevertheless, the transmission point is determined relative to the reference point which was determined on the basis of the aforementioned algorithm.

When those transmission characteristics of the radio transmission line have an allowably low fluctuation, therefore, the transmission power is controlled stably and highly accurately on the basis of the aforementioned TPC bits, and a sufficient throughput is stably retained for the processing of the channel control to be made in the radio base stations 71-1 and 71-2.

In the state where the fluctuation of the transmission characteristics of the radio transmission line is serious, on the contrary, the transmission point is determined with reference to the reference point which is determined on the basis of the aforementioned algorithm, even if the downward slots that have reached in advance are received. In both or either of the radio base stations 71-1 and 71-2, it may be impossible to retain the throughput which is required for the processing to be completed before any downward slot is subsequently transmitted.

Even when the downward slot reaching after that reference point is received, on the other hand, it may be impossible that a sufficient throughput necessary for the processing of the channel control is retained for the upward slot.

Moreover, the state where the throughput is short is generally made the more liable to occur when the symbol rate is set to the smaller value.

In the prior art, therefore, it is highly probable that the effective utilization of the radio frequency suited for the amount of the transmission information to be transmitted is blocked, or that a restriction is imposed on the design of the system suited for the zone configuration, the channel allocation and another combination.

SUMMARY OF THE INVENTION

An object of the present invention is to provide a radio terminal equipment which is flexibly adapted to various configurations of a system and which enables a highly reliable channel control and favorable transmission quality.

A further object of the present invention is to perform the channel control more stably and reliably than the prior art.

A further object of the present invention is to simplify the processing and to improve the responsiveness.

A further object of the present invention is to stably keep a point in time at which a transmission wave is to be transmitted to a radio transmission line even if the transmission characteristics of the radio transmission line sharply fluctuate.

A further object of the present invention is to suppress the deterioration of the transmission quality and the service quality due to the interference or obstruction on the radio transmission line.

A further object of the present invention is to simplify the configuration.

A further object of the present invention is to keep the performance and the service quality high.

A further object of the present invention is to enable flexible adaptation to the operating state of the system, the wireless zone, and the radio channel.

A further object of the present invention is to simplify the configurations of the hardware and the software.

A further object of the present invention is to improve the reliability and to reduce the running cost.

A further object of the present invention is to perform transmission power control at a high speed and to enable adaptation to the radio transmission system applied to the CDMA system originally having a near-far problem.

A further object of the present invention is to enable adaptation to a mobile communication system which may vary every moment in the transmission characteristics of the radio transmission line.

A further object of the present invention is to keep the transmission quality and the service quality high.

A further object of the present invention is to enable adaptation to various radio transmission systems.

A further object of the present invention is to enable flexible adaptation to various configurations of hardware and software as well as various zone configurations and channel allocations.

A further object of the present invention is to enable flexible adaptation to a multiple access system and a modulating system and to acquire a stable communication line in high transmission quality without drastic restrictions on the configurations of hardware and software.

The aforementioned objects are achieved by a radio terminal equipment characterized by obtaining a point in time which allows the transmission of a subsequent transmission unit (slot) on the basis of a channel control procedure, by receiving a radio wave separately reached from a plurality of radio stations during a period preceding the point in time transmission begins by more than the length of time needed for the process to be done under the channel controlling process preceding the beginning of transmission, and by obtaining the aforementioned point in time where the subsequent transmission unit should be transmitted, based on the point in time at which all or part of the radio waves was/were received.

In the radio terminal equipment, radio wave applied to the channel control is limited to the radio wave reached through the radio transmission line during the period of which the throughput required for the channel control can be acquired at the transmitting end and the receiving end.

Moreover, the aforementioned objects are achieved by the radio terminal equipment characterized in that the point in time at which transmission of the subsequent transmission unit is allowed is given relative to the preceding point in time at which transmission of any transmission unit is done.

In the radio terminal equipment, the radio wave applied to the channel control is specified by a simple window in a time-domain so long as the aforementioned point in time is reliably given.

Moreover, the aforementioned objects are achieved by the radio terminal equipment characterized in that a reference point in time is obtained as a weighted average of the levels or transmission qualities $e_1$ to $e_n$ of the radio waves and the times $t_1$ to $t_n$ at which the individual radio wave is received.

In the radio terminal equipment, the point in time at which the transmission wave is to be transmitted to the radio transmission line is stably kept even when the transmission characteristics of the radio transmission line sharply fluctuate.

Moreover, the aforementioned objects are achieved by the radio terminal equipment characterized in that a transmission unit is received as a radio wave in periods in a predetermined cycle, and that a period is given as a set of periods, in which radio waves, which individually follow another set of radio waves received during the period corresponding to the word length of the transmission unit and precedes the period given as a subset of periods, can be received by the local station.

In the radio terminal equipment, the radio wave to be processed under the channel control is limited to the ones reaching the local station during the period with the length of an interval almost equal to the length of a period in a cycle of the radio wave.

On the other hand, the aforementioned objects are achieved by the radio terminal equipment characterized in that a transmission unit is received as a radio wave during periods in a predetermined cycle, and that a period is given as a period which extends from the beginning of a period during which a radio wave subsequent to any radio wave first received is able to have reached, up until the end of a period during which a radio wave subsequent to any radio wave last received is able to have reached.

In the radio terminal equipment, the radio wave to be processed on the channel control is limited to the one which reached at the local station during the period simply clocked and almost equal to the period of the radio wave.

Moreover, the aforementioned objects are achieved by the radio terminal equipment characterized in that the length of time needed for the processing (including the processing to be done at a radio station connected through the radio transmission line) to be done under the channel control according to the channel controlling procedure is monitored and that the period corresponding to the result is determined.

In the radio terminal equipment, the process to be done according to the channel controlling procedure is stably performed with the load on the radio station kept at a proper level.

Moreover, the aforementioned objects are achieved by the radio terminal equipment characterized in that the length of time needed for the processing is obtained by being rounded by the value at which the deterioration of the transmission efficiency is tolerable.

In the radio terminal equipment, even if the radio terminal equipment of the present invention is in motion, the length of time needed for the processing the radio wave is easily obtained without lowering the performance, which is due to the fall of the transmission speed.

Moreover, the aforementioned objects are achieved by the radio terminal equipment characterized in that operations of the components unused during the process are restricted.

In the radio terminal equipment, the unnecessary power consumption is lowered so that reliability is improved and the running cost is reduced.

Furthermore, the aforementioned objects are achieved by a radio terminal equipment where the components to be given operation restrictions are not used for the process to obtain either a period for the processing or a starting point of the period.

In the radio terminal equipment, reduction of unnecessary power consumption of the elements unused for the internal processing, which obtains both or either of the aforementioned period and/or its starting point, is enabled.

Moreover, the aforementioned objects are achieved by the radio terminal equipment characterized in that process under the transmission power control is done per time slot, which is a transmission unit.

In the radio terminal equipment, the present invention can be applied to the radio transmission system applied to the CDMA system originally having the near-far problem, because the shorter the periods in cycles of the radio waves reaching local stations are, the higher the speed of the performance of the transmission power control is.

Furthermore, the aforementioned objects are achieved by the radio terminal equipment characterized in that transmission loss of the radio transmission line formed between a plurality of radio stations is obtained according to the level of the radio waves transmitted by the radio stations with known radiation power from the plurality of radio stations, and the radio wave received through the radio transmission line having a small transmission loss is made the object of the processing done under the channel controlling procedure.

In the radio terminal equipment, the present invention can be applied to the mobile communication system in which the transmission characteristics of the radio transmission line may vary every moment, since the wireless zone of the radio wave reaching the local station with high transmission quality or field strength level is an object of the channel control.

Moreover, the aforementioned objects are achieved by the radio terminal equipment characterized in that a demodulating means is provided, and that the demodulating means demodulates all or part of the radio waves to be a referential point in time.

In the radio terminal equipment, the transmission quality and the service quality are kept high since transmission information is given under the demodulating of a radio wave reaching the local station with high field strength level and transmission quality.

Furthermore, the aforementioned objects are achieved by the radio terminal equipment characterized in that demodulating means is provided and that the demodulating means demodulates radio waves to be a referential point in time together with all or part of the radio waves received preceding to the point in time at which the subsequent transmission unit is to be transmitted.

In the radio terminal equipment, the present invention can be applied to various radio transmission systems because transmission information is restored by desired demodulation processing.

Moreover, the aforementioned objects are achieved by the radio terminal equipment characterized in that the processing involves the processing to determine the point in time at which a subsequent transmission unit is to be transmitted, by transmitting the subsequent transmission unit to the determined point in time.

The radio terminal equipment can be flexibly adaptable to various configurations as long as the processing procedure is reliably done, because the process to be done assigning the aforementioned point in time.

Here, further objects and characteristics of the present invention will be described in detail in the following based on the accompanying drawings.

BRIEF DESCRIPTION OF THE DRAWINGS

In the accompanying drawings:

FIG. 6 is a diagram showing the configuration of a watching time compensation table;

DESCRIPTION OF THE PREFERRED EMBODIMENTS

Figure 1:
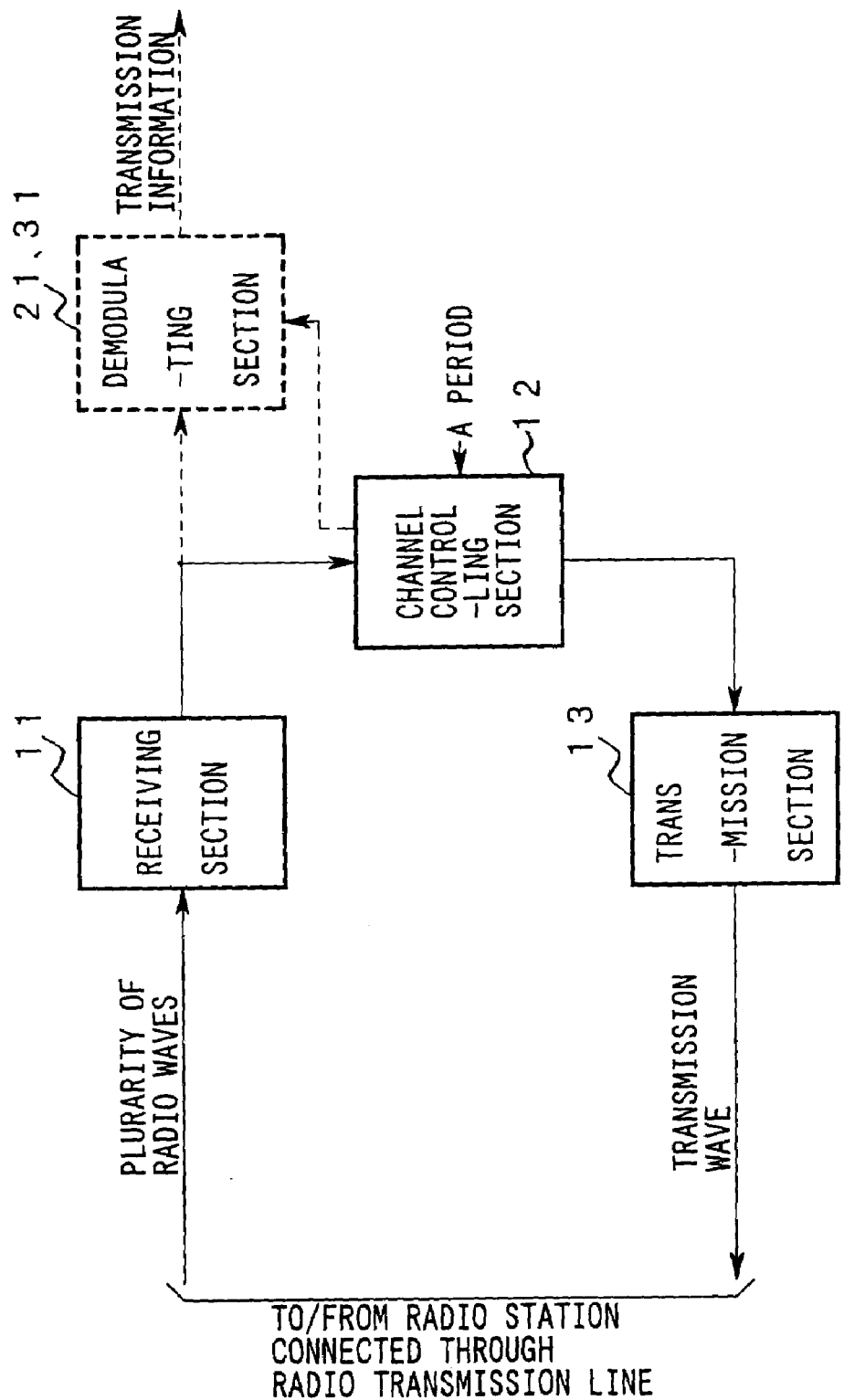
FIG. 1 is a block diagram showing the principle of the present invention.

First of all, the principle of a radio terminal equipment according to the invention will be described with reference to FIG. 1. FIG. 1 is a block diagram showing the principle of the invention.

The radio terminal equipment, shown in FIG. 1, is composed of a receiving section 11, a channel controlling section 12, a transmission section 13, and a demodulating section 21 and 31.

The principle of a first radio terminal equipment according to the invention is as follows.

The receiving section 11 receives a plurality of radio waves that concurrently reached through a radio transmission line with a deviation in time. The channel controlling section 12 processes any of the received radio waves according to the procedure of a channel control.

The transmission section 13 transmits a transmission wave signifying a response to the radio wave processed, to the radio transmission line.

On the other hand, the channel controlling section 12 is given in advance a period, for which both the length of time needed for the aforementioned processing and the length of time needed for the processing, that is done by the radio stations opposed to each other through a radio transmission line, of transmission waves, are adapted to the channel control system and to the transmission system of this radio transmission line. Moreover, the channel controlling section 12 processes such a radio wave that is received for that period by the receiving section 11 among the aforementioned plurality of radio waves.

In short, the radio wave to be processed under the channel control is limited to that which has reached through the radio transmission line within the period for which both the receiving end and the transmitting end of the radio wave can maintain the throughput of the processing for the channel control.

As compared with the prior art in which such radio wave is not limited in the least, therefore, the channel control is made stably and highly reliably.

The principle of a second radio terminal equipment according to the invention is as follows.

The channel controlling section 12 is given in advance a period as a time relative to the point in time at which specific one of a plurality of radio waves is received by the receiving section 11.

In short, the radio wave to be processed under the channel control is specified through a simple window in a time-domain so long as the point in time at which the aforementioned specific radio wave was received is given.

As compared with the first radio terminal equipment, therefore, the processing is simplified, and the responsiveness is improved.

The principle of a third radio terminal equipment according to the invention is as follows.

The receiving section 11 measures, on a plurality of radio waves, the receipt time and the transmission quality or field strength level respectively. The channel controlling section 12 determines the point in time at which the transmission wave is to be transmitted, as a relative value to the point in time which is equal to the average value of the sum of products of the time and the transmission quality or field strength level measured for a predetermined period. The transmission section 13 transmits the transmission wave at the point in time thus determined.

The aforementioned operation for obtaining the average value of the sum of products corresponds to the weighted integration which is performed at the time given in the sequence of a time series by using the transmission quality or field strength level given together with the time as the weight.

Even when the transmission characteristics of the radio transmission line abruptly fluctuate, therefore, the point in time at which the transmission wave is to be transmitted to that radio transmission line is stably maintained.

The principle of a fourth radio terminal equipment according to the invention is as follows.

A plurality of radio waves reach individually and sequentially for the periods having an identical nominal value.

On the other hand, the aforementioned period is given as a subset of the periods for which those radio waves can be received by the receiving section 11 subsequent to the point in time at which those radio waves individually reached during the preceding period.

Of the radio waves having reached through the radio transmission line, more specifically, the radio wave for the channel controlling section 12 to process under the channel control is limited to the radio wave which reached during the period given at an interval substantially equal to the period of those radio waves.

As compared with the case in which such period is not limited in the least according to the aforementioned period, therefore, the drop in the transmission quality and the service quality caused by the interference and jamming on the radio transmission line is suppressed.

The principle of a fifth radio terminal equipment according to the invention is as follows.

A plurality of radio waves reach individually and sequentially in a common period having an identical nominal value.

On the other hand, the aforementioned period is given as a subset of the periods from the point in time at which those radio waves firstly reached for the preceding period to the point in time at which another group of radio waves finally reached.

Of the radio waves having reached through the radio transmission line, more specifically, the radio wave for the channel controlling section 12 to process according to the channel control is given under a simple clocking and is limited to the radio wave which reached during the period given at an interval substantially equal to the period of those radio waves.

As compared with the aforementioned fourth radio terminal equipment, therefore, the configuration is simplified, and as in the radio terminal equipment, the drop in the transmission quality and the service quality, caused by the interference and jamming on the radio transmission line is suppressed.

The principle of a sixth radio terminal equipment according to the invention is as follows.

The channel controlling section 12 determines the length of time needed for processing the radio wave received by the receiving section 11 according to the procedure of a channel control, and the length of time needed for a radio station connected through the radio transmission line to process the response transmitted by the transmission section 13 under the procedure of the processing.

Moreover, the channel controlling section 12 processes among these radio waves, such radio waves that was received during the period for which the determined individual lengths of time take values suitable for the channel control system.

In short, the processing to be done under the procedure of the channel control by the channel controlling section 12 is stably performed while holding the load of the aforementioned radio station at a proper level, so that the performance and the service quality are kept high.

The principle of a seventh radio terminal equipment according to the invention is as follows.

Both or either of the length of time needed for the processing of the radio wave by the receiving section 11 and the length of time needed for a radio station opposed through a radio transmission line to process a response transmitted by the transmission section 13 according to the procedure of the processing vary in accordance with an event which can be identified by the channel controlling section 12 in the process of the channel control.

The channel controlling section 12 determines both or either of the aforementioned lengths of time needed in accordance with the event which was identified on the basis of the procedure of the channel control.

In short, the aforementioned lengths of time needed are flexibly determined in a desired accuracy even when the lengths of time needed are different depending upon the operating states of the system, the wireless zone and the radio channel to be accessed to by the radio terminal equipment according to the invention, so long as their factors are identified as the event under the aforementioned procedure of the channel control.

The principle of an eighth radio terminal equipment according to the invention is as follows.

The channel controlling section 12 determines the length of time needed for processing the radio wave received by the receiving section 11 according to the procedure of the channel control, in an accuracy allowing both or either of the fall in the transmission speed of the radio transmission line and the deviation of the radio wave.

In short, the length of time needed for processing the radio wave by the channel controlling section 12 is conveniently determined without any deterioration in the performance, caused by the fall in the transmission speed, even while the radio terminal equipment according to the invention is moving.

As compared with the aforementioned sixth radio terminal equipment, therefore, the configurations of hardware and software are simplified.

The principle of a ninth radio terminal equipment according to the invention is as follows.

The channel controlling section 12 restricts, in its processing procedure, the operation of such one of elements configuring the receiving section 11, the channel controlling section 12 and the transmission section 13 as is not used for processing the radio wave received by the receiving section 11 under the channel controlling procedure.

In short, the useless power consumption is suppressed, so that the reliability is enhanced, and so that the running cost is reduced, as compared with the foregoing first to eighth radio terminal equipments.

The principle of a tenth radio terminal equipment according to the invention is as follows.

The element, which is not used for processing the radio wave received by the receiving section 11 under the procedure of the channel control is such one of the elements configuring the receiving section 11, the channel controlling section 12 and the transmission section 13 as is not used for determining both or either of the period suited for the transmission system of the radio transmission line and the starting point of the period.

In short, there is reduced the power to be uselessly consumed by such one of the elements configuring the channel controlling section 12 as is not used for an internal processing to determine both or either of the aforementioned period and the starting point of the period.

As compared with the aforementioned ninth radio terminal equipment, therefore, the reliability is enhanced, and the running cost is reduced.

The principle of an eleventh radio terminal equipment according to the invention is as follows.

A plurality of radio waves individually contains control information on the transmission power control and sequentially reach for periods with a common nominal value. The channel controlling section 12 controls the transmission power, as suited for the control information contained in a specific one of a plurality of radio waves having reached during the preceding period, through both or either of the receiving section 11 and the transmission section 13.

In short, the transmission power control is made at the higher speed for the aforementioned shorter period, so that the invention can be applied to a radio transmission system to which the CDMA intrinsically accompanied by a near-far problem is applied.

The principle of a twelfth radio terminal equipment according to the invention is as follows.

The channel controlling section 12 watches the transmission quality or the field strength level of the radio wave, which is received by the receiving section 11 for the individual wireless zones under the zone configuration and the channel allocation, and makes a channel control on the wireless zone in which the transmission quality or the field strength level is the maximum.

In short, the wireless zone in which the transmission quality or the field strength level of the radio wave having reached is to be an object of the channel control, so that the invention can be applied to a mobile communication system in which the transmission characteristics of the radio transmission line can vary every moment.

The principle of a thirteenth radio terminal equipment according to the invention is as follows.

The demodulating section 21 acquires transmission information either by demodulating all or some of the radio waves, which become an object of the processing by the channel controlling section 12, or by demodulating under a predetermined weighting.

In short, the transmission information is acquired by demodulating the radio waves having reached with high field strength level and transmission quality, so that the transmission quality and the service quality are kept high.

The principle of a fourteenth radio terminal equipment according to the invention is as follows.

The demodulating section 31 acquires transmission information either by demodulating all or some of a plurality of radio waves having reached through the radio transmission line and received in parallel by the receiving section 11, or by demodulating under a predetermined weighting.

In short, the transmission information is restored under the desired demodulations, so that the foregoing first to twelfth radio terminal equipments can be realized in various radio transmission systems.

The principle of a fifteenth radio terminal equipment according to the invention is as follows.

The channel controlling section 12 determines the point in time at which the transmission wave is to be transmitted to the radio transmission line. On the other hand, the transmission section 13 transmits the transmission wave at the point in time thus determined.

Specifically, the processing to be done by the channel controlling section 12 under the procedure of the channel control involves the one for determining the aforementioned point in time, so that it can be flexibly applied to the various zone configurations, channel allocations and configurations of the hardware and software, so long as the processing procedure is reliably given.

The principle of a sixteenth radio terminal equipment according to the invention is as follows.

The point in time at which the transmission wave is to be transmitted to the radio transmission line varies according to the event which the channel controlling section 12 can be identified in the procedure of the channel control.

The channel controlling section 12 determines the point in time at which the aforementioned transmission wave is to be transmitted, according to the event which was identified on the basis of the channel controlling procedure.

Specifically, the point in time at which the aforementioned transmission wave is to be transmitted to the radio transmission line is flexibly determined in a desired accuracy even when it is different according to the operating states of the system, the wireless zone and the radio channel to be accessed to by the radio terminal equipment of the invention, so long as the factors to be used for determining the point in time are identified as the event in the aforementioned channel controlling procedure.

Embodiments of the present invention will be described in detail with reference to the accompanying drawings that follows.

Figure 2:
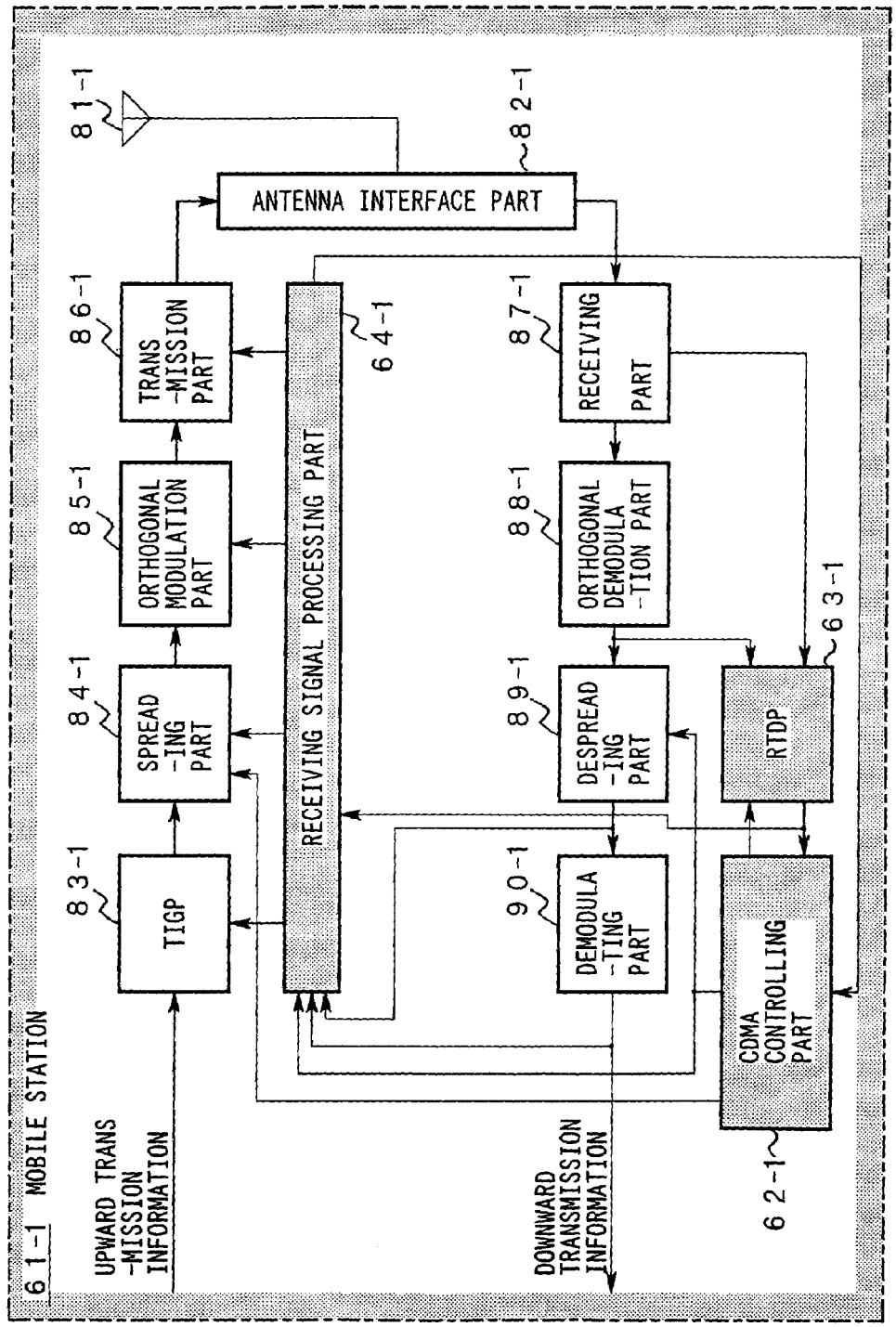
FIG. 2 is a diagram showing the first embodiment of the present invention.

FIG. 2 is a diagram showing an embodiment of the invention.

Figure 10:
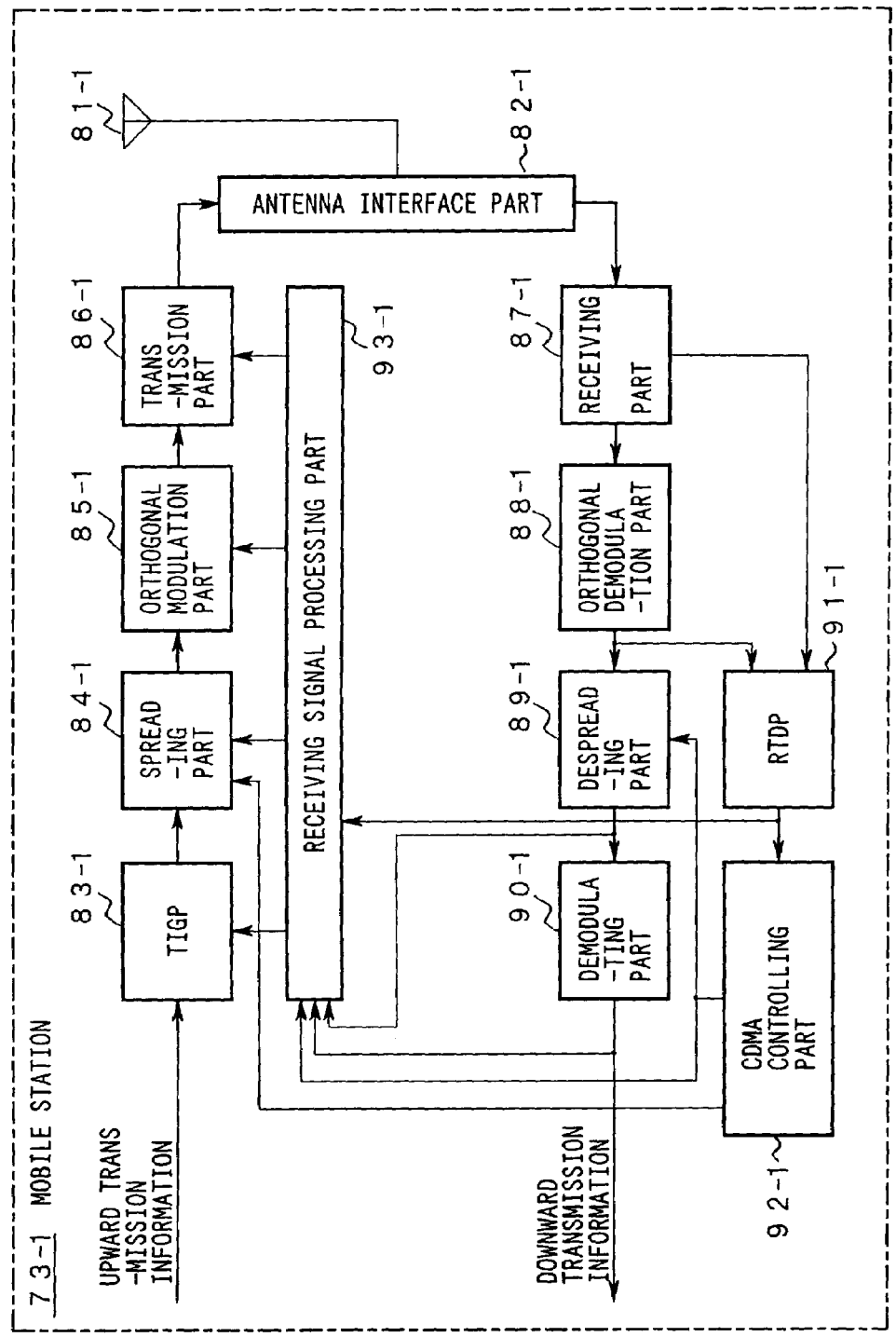
FIG. 10 is a diagram showing the configuration of a mobile station.
Figure 11:
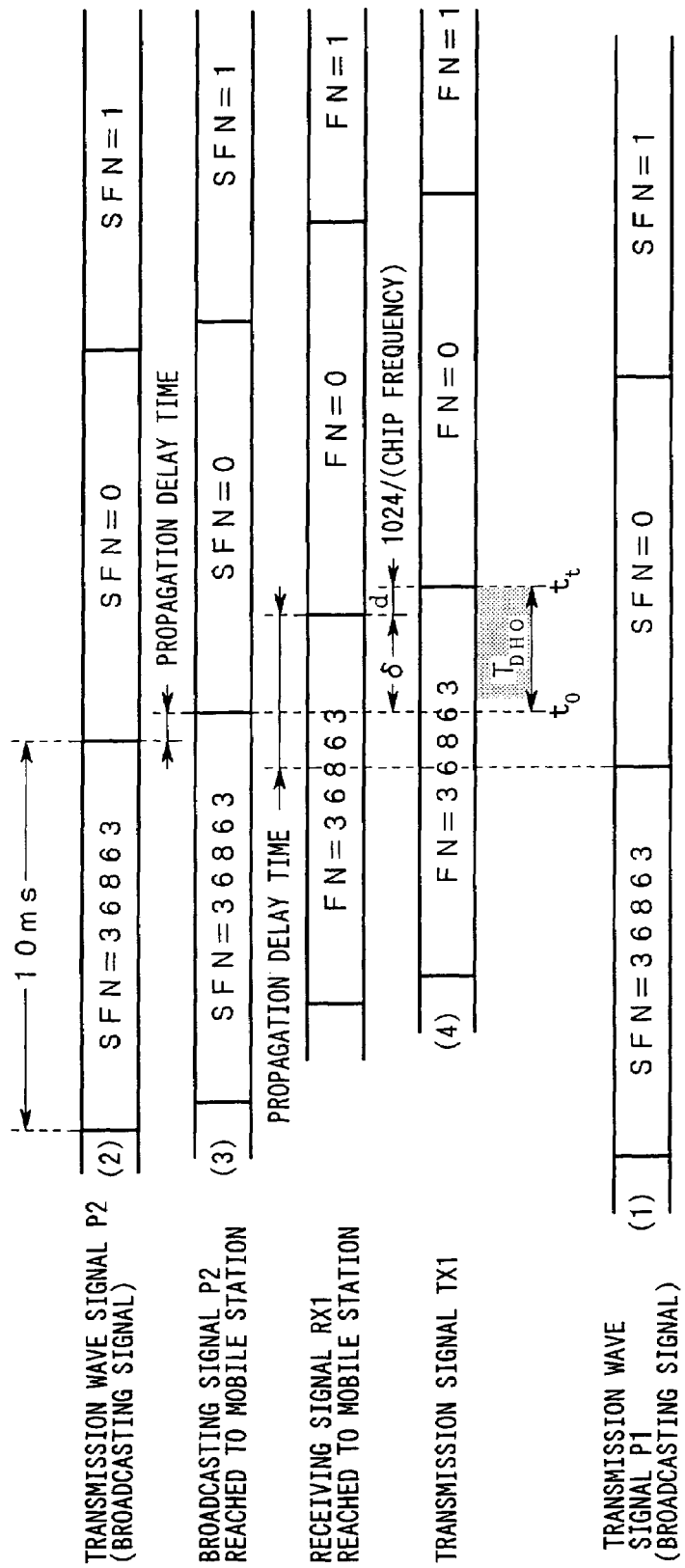
FIG. 11 is a diagram showing the configuration of a frame received and transmitted through a radio transmission line.
Figure 12:
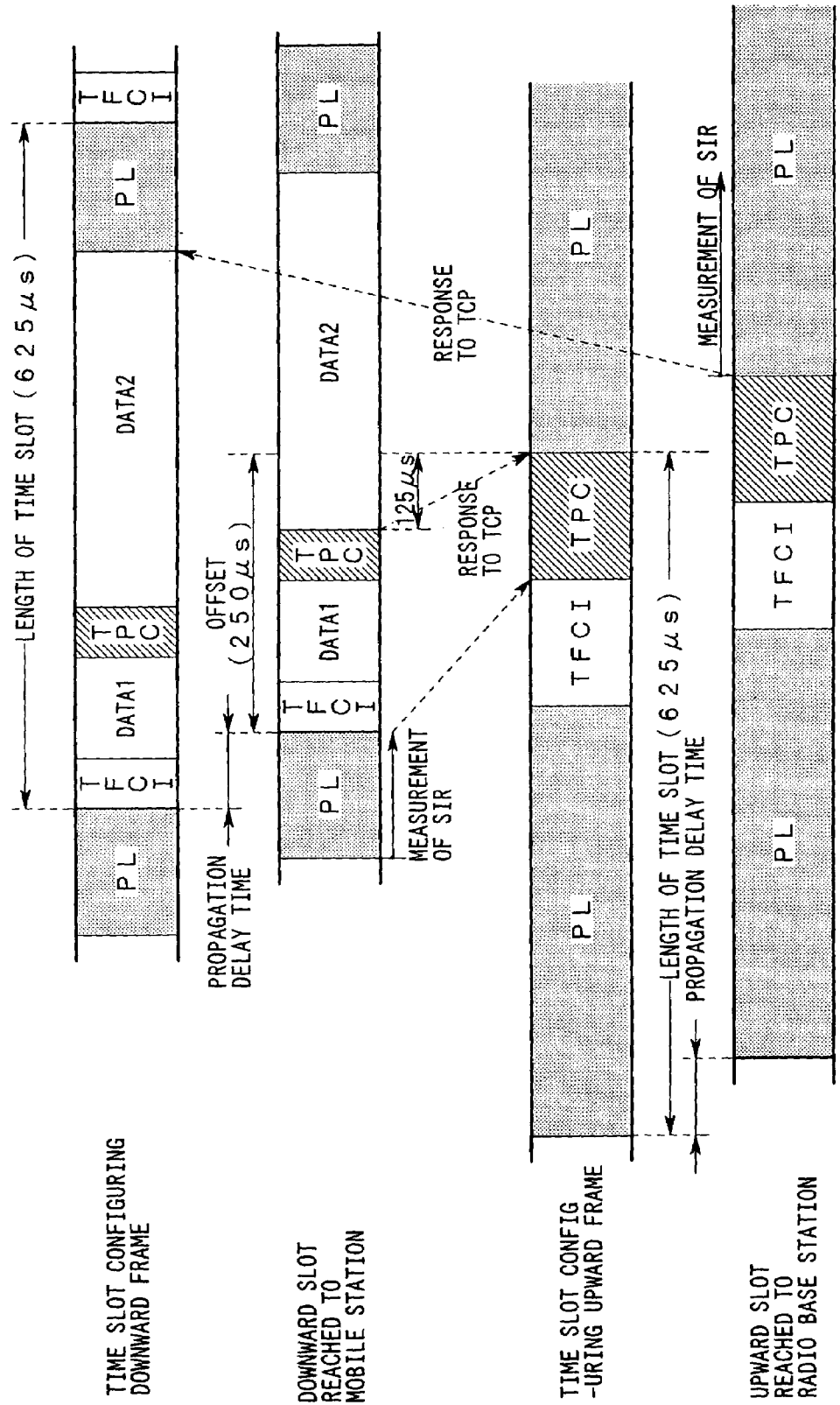
FIG. 12 is a diagram showing the configuration of a time slot.
Figure 13:
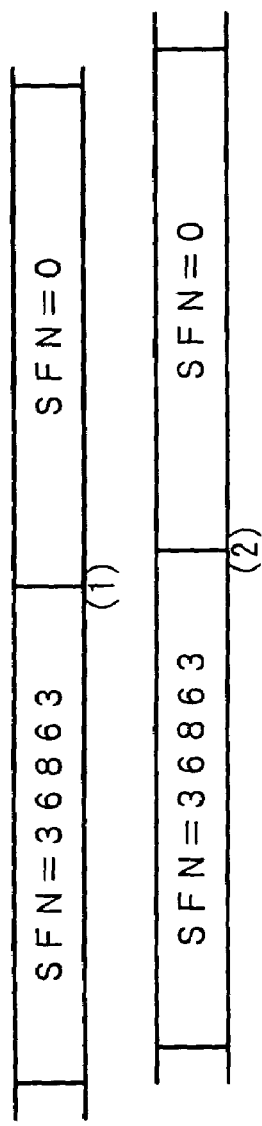
FIG. 13 is a diagram showing a downward slot subsequently reaching a mobile station.

In FIG. 2, the components and functions same as those mentioned in FIG. 10 will be indicated by the common reference numerals and the description thereof will be omitted here.

Figure 9:
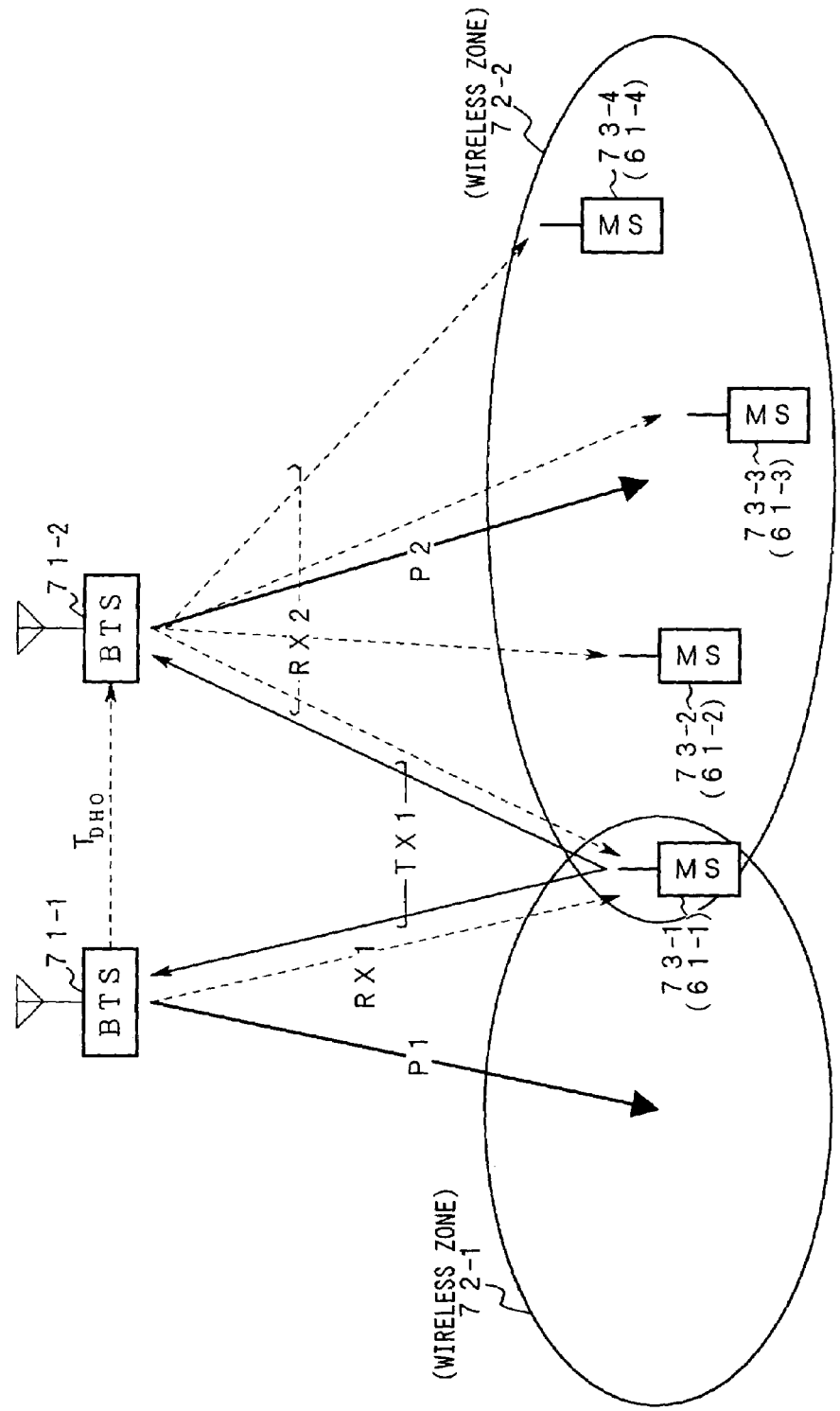
FIG. 9 is a diagram showing an example of the configuration of a mobile communication system having applied the CDMA system.

The configurational differences between this embodiment and the prior art shown in FIG. 10 is in the configuration of mobile stations 61-1 to 61-4 which are provided in place of the mobile stations 73-1 to 73-4 shown in FIG. 9.

The configurational differences between the mobile station 61-1 and the mobile station 73-1 are that: a CDMA controlling part 62-1 is provided in place of the CDMA controlling part 92-1; a receiving timing detecting part 63-1 is provided in place of the receiving timing detecting part 91-1; a receiving signal processing part 64-1 is provided in place of the receiving signal processing part 93-1; the control input of the receiving timing detecting part 63-1 is connected with a corresponding control output of the CDMA controlling part 62-1; and with a specific control input of the CDMA controlling part 62-1 is connected a corresponding output of the receiving signal processing part 64-1.

Here, the configurations of the mobile stations 61-2 to 61-4 are identical to that of the mobile station 61-1, so that the corresponding components will be indicated by the common reference numerals to which the suffixes "2" to "4" are attached and the description thereof will be omitted here.

On the other hand, the configuration of the mobile communication system for providing the communication services for the mobile stations 61-1 to 61-4 thus configured is basically identical to that of the prior art shown in FIG. 9.

Therefore, the numerals "61-1" to "61-4" are added to the mobile stations 73-1 to 73-4 shown in FIG. 9, respectively, and reference will be additionally made to FIG. 9.

Figure 3:
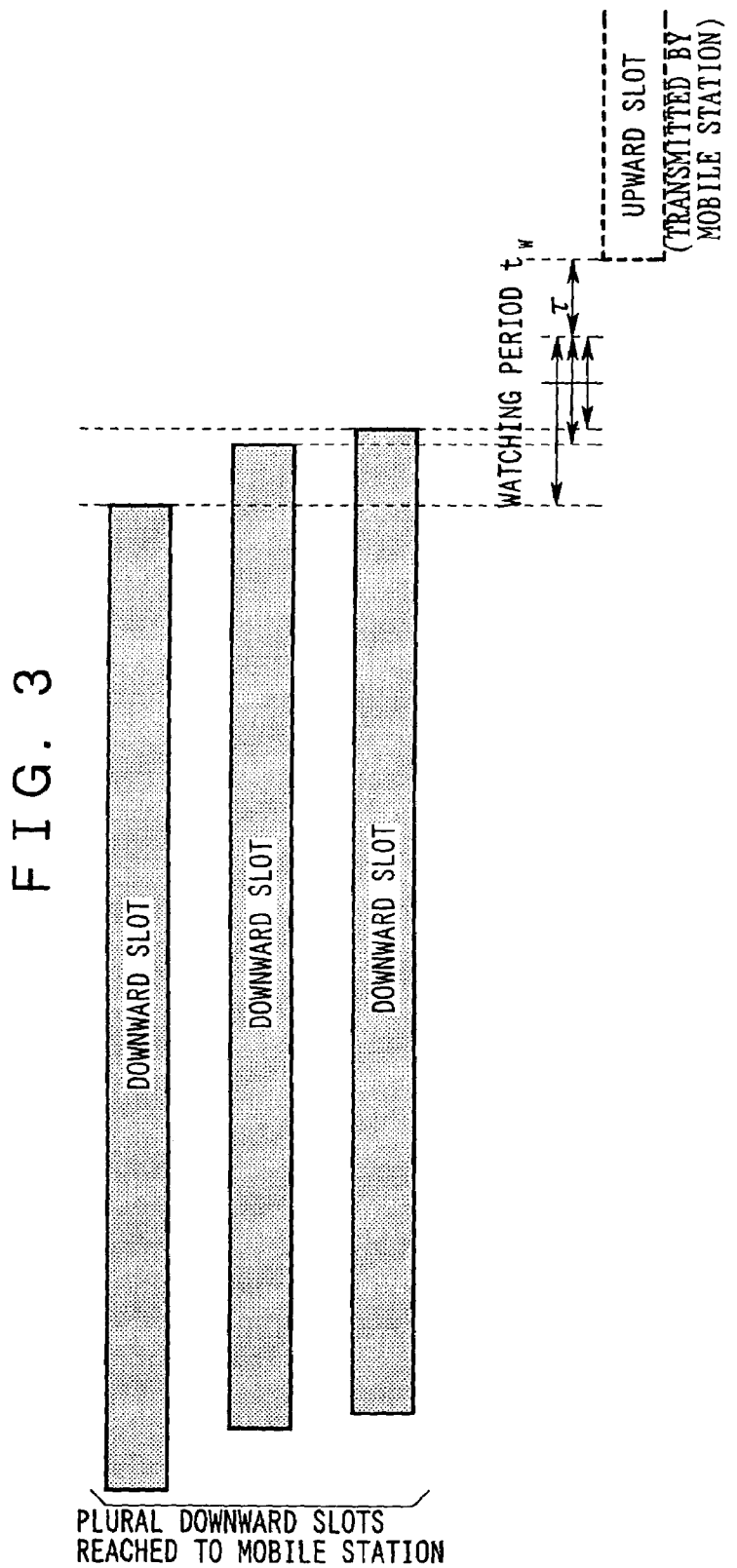
FIG. 3 is a diagram explaining the operations of the first embodiment of the present invention.

FIG. 3 is a diagram for explaining the operations of the first embodiment of the invention.

Figure 4:
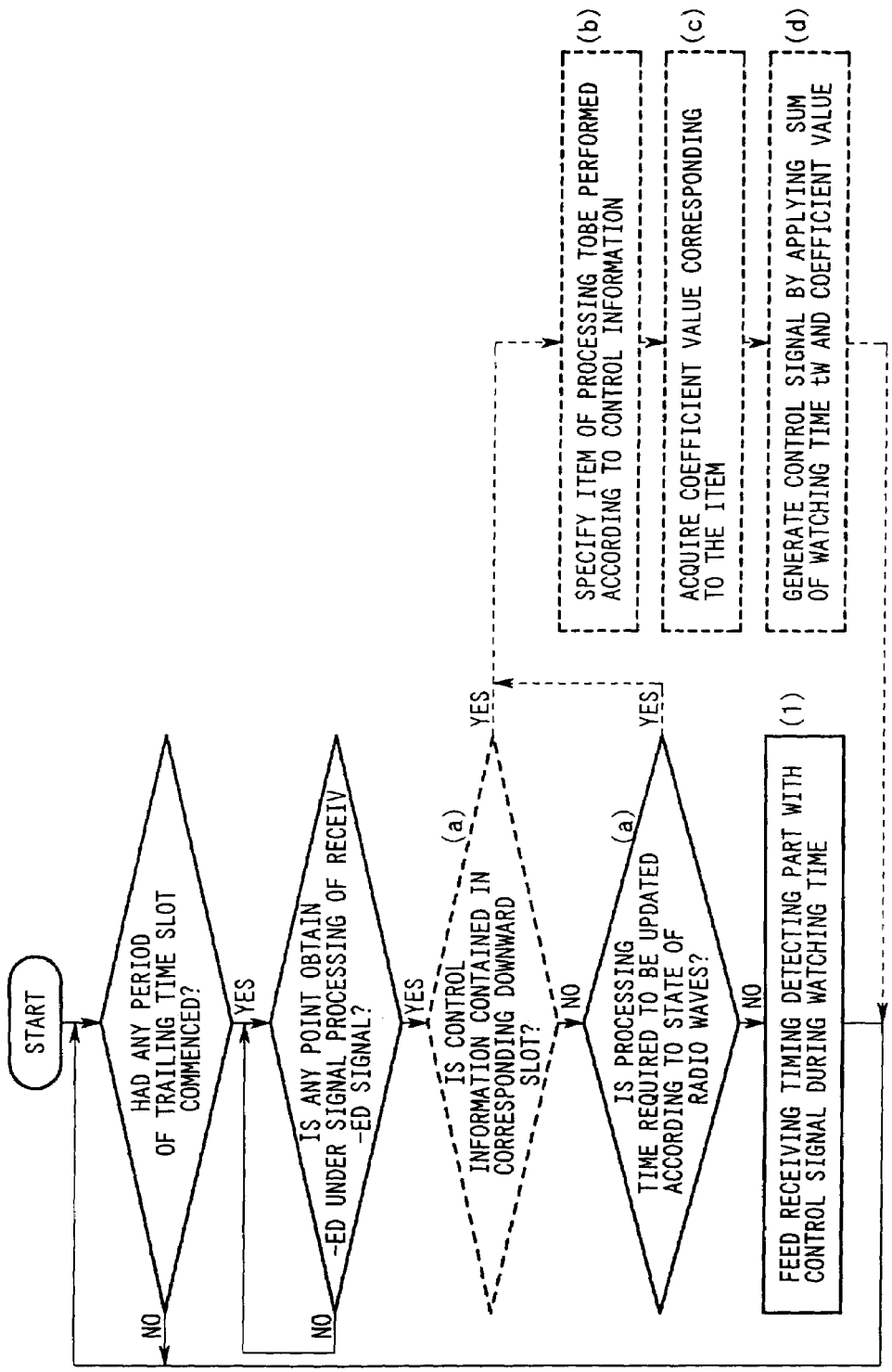
FIG. 4 is a flow chart showing the operations of the first to fourth embodiments of the present invention.

FIG. 4 is a flow chart of the operations of the first to fourth embodiments of the invention.

The operations of the first embodiment of the invention will be described with reference to FIGS. 2 to 4 and FIG. 8.

The receiving signal processing part 64-1 fetches the "downward transmission information", obtained, in common with the prior art, in conjunction with the antenna interfacing part 82-1, the receiving part 87-1, the orthogonal demodulation part 88-1, the despreading part 89-1, the demodulating part 90-1 and the receiving timing detecting part 63-1, to synchronize the individual downward slots contained in the "downward transmission information".

Moreover, the receiving signal processing part 64-1 determines the points in time signifying the beginnings (or ends) of those downward slots, individually, and informs the CDMA controlling part 62-1 of those points in time sequentially.

On the other hand, the CDMA controlling part 62-1 is given in advance a watching time tw ($=TF/16-\tau$) that signifies the period (which may be one succeeding longer than a time slot length ($=625$ microseconds)) satisfying the condition to retain all the following times on the points in time thus informed, as a relative value to the point in time which can be the beginning of the succeeding upward slots, as shown in FIG. 3:

Time required for the processing (including not only the internal processing to be done only by the CDMA controlling part 62-1 but also the processing to be done in association with the receiving signal processing part 64-1) to be done on the information contained in the corresponding downward slot according to the procedure of the channel control;

Time required for the generation and transmission of an upward slot (or frame) including the information to be transmitted to a radio base station (which may be not only the radio base station for forming a wireless zone where the local station is located but also the radio base station capable of becoming a destination in the hand-over procedure); and Time required for a destination radio base station to receive such upward slot reliably and to process the upward slot according to the procedure of the channel control by warranting the responsiveness and the service quality desired.

Here, the value of such watching time tw is preset as suited not only for the zone configuration and the channel allocation of the mobile communication system, to which the invention is applied, and the amount, type and transmission speed of the information to be received or transmitted through the radio transmission line but also for the throughput and the mode of a functional distribution or load distribution of the hardware which is mounted on the mobile stations 61-1 to 61-4 and the radio base stations 71-1 and 71-2.

For every periods of the time slot, the CDMA controlling part 62-1 feeds (FIG. 4(1)) the receiving timing detecting part 63-1, when informed in advance of any point in time by the receiving signal processing part 64-1, as described above, with the control signal signifying the period from that point in time to the aforementioned watching time tw.

The receiving timing detecting part 63-1 detects, only during the period signified by the control signal, the field strength level of the downward slot (or all the downward slots when the single frames has been received as the radio waves signifying those downward slots that reached the different point in time by a multipath formed in the radio transmission line) received from both or either of the radio base stations 71-1 and 71-2, and detects a prescribed point tr (hereinafter referred to as the "reference point") according to a predetermined algorithm.

The CDMA controlling part 62-1 determines the point in time which is given, in common with the prior art, as the relative value to that reference point tr, as a transmission point.

Moreover, the CDMA controlling part 62-1 is associated as in the prior art with the receiving signal processing part 64-1 and the spreading part 84-1 to start the transmission of the upward slot containing both or either of the speech signal to be transmitted to the radio base stations 71-1 and 71-2 and any control information relating to the channel control of a corresponding call to some destination, at the aforementioned transmission point, and control the transmission power by giving the transmission part 86-1 the level suited for the value of the TCP bit contained in any downward slot received in advance.

Thus according to this embodiment, for the period suited for the configuration and the specification of the system, the predetermined processing is completed for the information contained in the downward slot received in advance.

Therefore, the service quality is kept higher than that of the prior art in which the reference point tr is set at a point in time other than the aforementioned watching time tw.

Here, this embodiment performs the aforementioned transmission power control, which corresponds to a processing to be done according to the procedure of the channel control but which may be omitted when the invention is applied to the radio transmission system allowing the near-far problem and the degradation of the transmission quality.

In this embodiment, on the other hand, there is not specified the radio waves (or the combination of the frames contained in the "downward transmission information") to be demodulated by the demodulating part 90-1.

However, for example, the CDMA controlling part 62-1 gives the demodulating part 90-1 and the despreading part 89-1 the watching time tw together with the aforementioned control signal: only the radio waves, which were received for the period over the watching time tw from the point in time informed by the receiving signal processing part 64-1, may be the object of the demodulation. Alternatively, as in the prior art, all the radio waves may be the object of the demodulation irrespective of such watching time tw.

In this embodiment, moreover, the processing to be done as the reference of calculating the aforementioned watching time tw by the CDMA controlling part 62-1 according to the procedure of the channel control is not specified. When the processing for determining the transmission point is done not by the dedicated hardware but under a program control, for example, the throughput of the processing may be taken into consideration as the reference for calculating the watching time tw.

The operations of a second embodiment of the invention will be described with reference to FIG. 2.

The difference of this embodiment from the aforementioned first embodiment resides in the following operations to be done by the receiving timing detecting part 63-1 and in the processing procedure for the CDMA controlling part 62-1 to determine the reference point tr.

The receiving timing detecting part 63-1 detects the received points t1 to tn (hereinafter referred to as the "individual points") for all the downward slots received from both or either of the radio base stations 71-1 and 71-2, only during the period which is signified by the control signal given by the CDMA controlling part 62-1.

On the other hand, the receiving timing detecting part 63-1 informs the CDMA controlling part 62-1 of those individual points t1 to tn sequentially as combinatorial sequences (t1, e1), - - - , and (tn, en) with measured field intensities (e1–en).

For these combinatorial sequences, the CDMA controlling part 62-1 determines the reference point tr as the weighted average value weighted by the field strength level, as expressed by the following formula:

$$t_r = \frac{1}{n} \cdot \sum_{i=1}^{n} (e_1 \cdot t_1)$$

Moreover, the CDMA controlling part 62-1 determines the transmission point in advance according to the reference point tr as in the foregoing first embodiment.

Thus according to this embodiment, the reference point is given as the average value, for which the point in time at which a plurality of downward slots are individually received is weighted the more for the higher field intensities of those downward slots.

Even when the transmission characteristics of the radio transmission line drastically fluctuate in response to the movement of the mobile station 61-1 and the change in landform and the planimetry existing in the radio transmission line formed between the mobile station 61-1 and the radio base stations 71-1 and 71-2, therefore, an abrupt change in the reference point is avoided to keep the accuracy of the channel control and the communication quality stably high.

Here in this embodiment, the aforementioned field intensities e1 to en are applied as the weights, but the transmission qualities (as given as syndromes or bit error rates, for example) to be identified in the decoding process suited for the transmission line coding system may be applied as the weights in place of or together with those field intensities e1 to en.

FIG. 4 is a flow chart of the operations of the first to fourth embodiments of the invention.

The operations of the third embodiment of the invention will be described with reference to FIG. 2 and FIG. 5.

The difference of this embodiment from the foregoing individual embodiments resides in the following processing procedure which is made by the CDMA controlling part 62-1 to generate the control signal to be fed to the receiving timing detecting part 63-1.

As in the foregoing embodiments, the receiving signal processing part 64-1 fetches the "downward transmission information" to synchronize with the individual frames contained in the "downward transmission information".

Moreover, the receiving signal processing part 64-1 specifies the points in time signifying the trails of those frames on the basis of the individually contained frame numbers. SFN and the known configurations, and informs the CDMA controlling part 62-1 of those points in time sequentially.

Just after the local station shifts to a standby state in any wireless zone, on the other hand, the CDMA controlling part 62-1 determines the reference point tr, as in the prior art or in any of the foregoing embodiments, and determines the relative transmission point to that reference point.

Here, when the transmission point is to be determined as in any of the foregoing embodiments, the CDMA controlling part 62-1 feeds the receiving timing detecting part 63-1 with the control signal signifying the period over the aforementioned watching time tw from the point in time informed foremost by the receiving signal processing part 64-1 for every periods of the downward slots.

On the other hand, the number of the downward slots to be received by the receiving timing detecting part 63-1 during the period signified by that control signal will be assumed "N" for simplicity.

The CDMA controlling part 62-1 identifies, after having performed the aforementioned operations over a single downward slot period, the period (hereinafter referred to as the "provisory period") which is composed of a set of periods subsequent by (TF/16−mN) to (TF/16+mP) on the time axis relative to the individual points informed by the receiving signal processing part 93-1, as hatched in FIG. 5.

Figure 5:
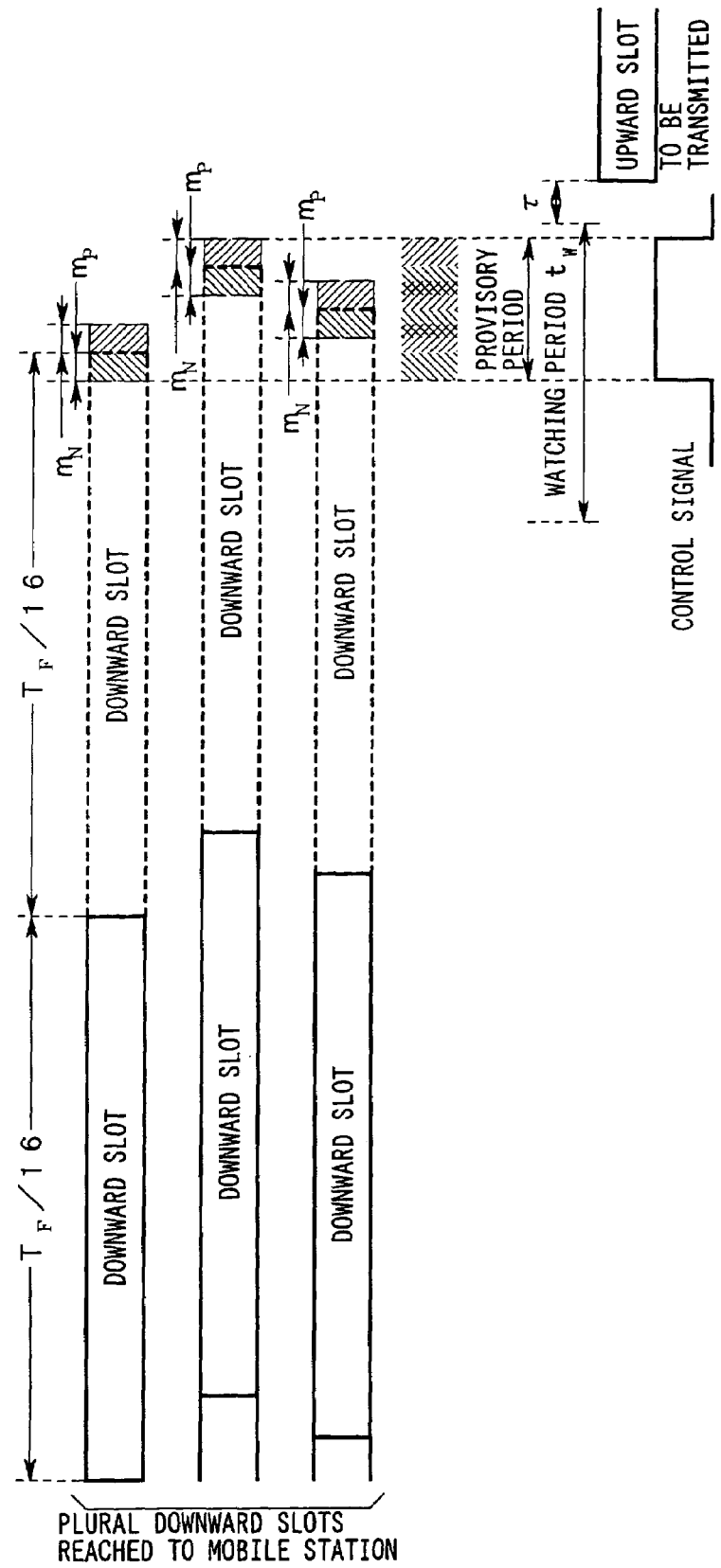
FIG. 5 is a diagram explaining the operations of the third embodiment of the present invention.

Moreover, the CDMA controlling part 62-1 feeds the receiving timing detecting part 63-1 with the control signal signifying such one in those provisory periods as corresponds to the period over the aforementioned watching period tw from the leading point of the provisory period, as shown in FIG. 5.

Here, both the letters mN and mP are positive values signifying the absolute values of the lower limit and the upper limit of such a deviation of the period (=TF/16) of the downward slot as is allowed insofar as the aforementioned conditions for giving the watching time tw are satisfied.

Specifically, the downward slot whose field strength level is identified by for the receiving timing detecting part 63-1 for detecting the reference point tr is limited to the downward slot which is received again later than the period of a substantially single downward slot with respect to the downward slot antecedently received.

Thus according to this embodiment, the possibility for the reference point tr to be improperly fluctuated by the abrupt fluctuation in the transmission characteristics of the radio transmission line, the overreach and so on is suppressed to keep the transmission quality is kept favorable and the channel control is carried out stably.

Here in this embodiment, the CDMA controlling part 62-1 feeds the receiving timing detecting part 63-1 with the control signal signifying such one in the provisory period as corresponds to the period over the aforementioned watching period tw from the leading point of the provisory period.

However, the processing may be simplified by feeding the receiving timing detecting part 63-1 with the control signal signifying such a period of the period continuing from the beginning to the end of the provisory period, for example, in place of the aforementioned period, as corresponds to the period over the watching period tw from the leading point of that period.

In this embodiment, on the other hand, the aforementioned absolute values mN and mP are not specified.

However, these absolute values mN and mP may be any value as long as they fit the configuration and specifications of the system and are reliably given in advance.

The operations of the fourth embodiment of the invention will be described with reference to FIG. 2 and FIG. 4.

The difference of this embodiment from the foregoing individual embodiments resides in the following processing procedure to be performed by the CDMA controlling part 62-1.

In a specific storage domain of the main memory built in CDMA controlling part 62-1, as shown in FIG. 6, a watching time compensation table 62A in which a combination of the following processing identifier IDP and a coefficient Δt is registered in advance is allocated:

Processing identifier IDP signifying an item of processing to be done under the procedure of the channel control; and Coefficient Δt to be applied for compensating the aforementioned watching time tw to a value suited for the throughput required for the processing signified by the processing identifier IDP.

Here, the coefficient Δt is given as a positive value or a negative value suited for the throughput preset as the premise for calculating the watching time tw.

On the other hand, this throughput contains not only the throughput of the processing done only by the CDMA controlling part 62-1 but also the fluctuation of the response time of the individual parts sharing the predetermined load and function in association with that CDMA controlling part 62-1.

This CDMA controlling part 62-1 fetches the "downward transmission information" contained in the individual downward slots obtained by the despreading part 89-1 and the "downward transmission information" contained in the downward slot obtained by the demodulating part 90-1, and judges (FIG. 4(*a*)) whether or not the control information on the channel control is contained in those downward slots or whether or not the state (i.e., quality or distribution) of the radio waves is the state in which the processing time should be updated.

When the result of the judgement above is true, moreover, the CDMA controlling part 62-1 analyzes the state of the corresponding control information or radio wave, to specify (FIG. 4(*b*)) the item of the processing to be done according to the control information, and acquires (FIG. 4(*c*)) the coefficient value registered in the watching time compensation table 62A together with the processing identifier signifying that item.

On the other hand, the CDMA controlling part 62-1 applies (FIG. 4(*d*)) the correction value which is given as a sum of the aforementioned watching time tw and the coefficient value thus obtained, in place of the watching time tw.

In other words, the watching time tw is suitably updated in response to the increase/decrease of the throughput of the processing to be done according to the control information contained in the received downward slots.

According to this embodiment, therefore, as compared with the case in which the watching time tw is not updated in the least, the drop in the responsiveness and the transmission quality is relaxed and a flexible channel control based on the various procedures can be achieved.

Here in this embodiment, neither the processing item corresponding to the processing identifier IDP and the accuracy of the coefficient Δt are specified.

However, the itemizing mode of the processing item and the accuracy of the coefficient Δt may be set anyhow so long as the watching time tw is updated in the desired reliability and accuracy within the range of the storage capacity of the main memory and the throughput in the CDMA controlling part 62-1.

The operations of the fifth embodiment of the invention will be described with reference to FIG. 2 and FIG. 6.

The difference of this embodiment from the foregoing fourth embodiment resides in the procedure of the following processing to be done by the CDMA controlling part 62-1.

In the main memory of the CDMA controlling part 62-1, there is allocated, in place of the watching time compensation table 62A, a watching time compensation table 62B in which, in advance, with the following controlled object identifier idC and restriction period information idP are stored 35 individually corresponding to the aforementioned processing identifier IDP:

Controlled object identifier idC signifying all or some of the despreading part 89-1, the receiving timing detecting part 63-1, the transmission information generating part 83-1, the spreading part 84-1, the orthogonal modulation part 85-1, the transmission part 86-1 and the receiving signal processing part 64-1; and Restriction period information idP given as a relative value to either the point in time of the beginning (or end) of the upward slots to be transmitted to the radio base stations 71-1 and 71-2 or the point in time (hereinafter referred to as the "reference point") of the beginning (or end) of the downward slots received from those radio base stations 71-1 and 71-2 and signifying the period for which the operations of the individual parts signified individually by the aforementioned controlled object identifier idC are to be restricted.

The CDMA controlling part 62-1 acquires, when determining the processing identifier IDP as in the foregoing fourth embodiment, the controlled object identifier idC and the restriction period information idP which are registered in the watching time compensation table 62B in a manner to correspond to that processing identifier IDP.

Moreover, the CDMA controlling part 62-1 restricts the operations of such all or some of the despreading part 89-1, the receiving timing detecting part 63-1, the transmission information generating part 83-1, the spreading part 84-1, the orthogonal modulation part 85-1, the transmission part 86-1 and the receiving signal processing part 64-1 as are signified by that controlled object identifier idC, over the period which is given by the restriction period information idP relative to the reference time.

Thus according to this embodiment, in the procedure of the processing to be done under the procedure of the channel control in response to the downward slots received antecedently from the radio base stations 71-1 and 71-2, the operations of the individual portions, which may not operate, are restricted under the lead of the CDMA controlling part 62-1.

As compared with the case in which no such restriction on the operations is made, therefore, the power consumption is reduced so that the time for which the communication service is provided continuously without charging the battery will be elongated.

Here in this embodiment, the controlled object identifier idC contains an identifier signifying any one of the despreading part 89-1, the receiving timing detecting part 63-1, the transmission information generating part 83-1, the spreading part 84-1, the orthogonal modulation part 85-1, the transmission part 86-1 and the receiving signal processing part 64-1.

However, the controlled object identifier idC contains a plurality of identifiers so that the electric power to be uselessly consumed at the individual parts may be reduced more accurately by incorporating the identifier signifying the period, for which the operations are restricted in the individual parts signified individually by those identifiers, into the restriction period information idP.

In this embodiment, on the other hand, the operations are wholly restricted over the period signified by the restriction period information idP upon the despreading part 89-1, the receiving timing detecting part 63-1, the transmission information generating part 83-1, the spreading part 84-1, the orthogonal modulation part 85-1, the transmission part 86-1 and the receiving signal processing part 64-1.

However, restrictions above may be suitably made at such a module in the hardware or software that a useless processing and power consumption are made.

Figure 7:
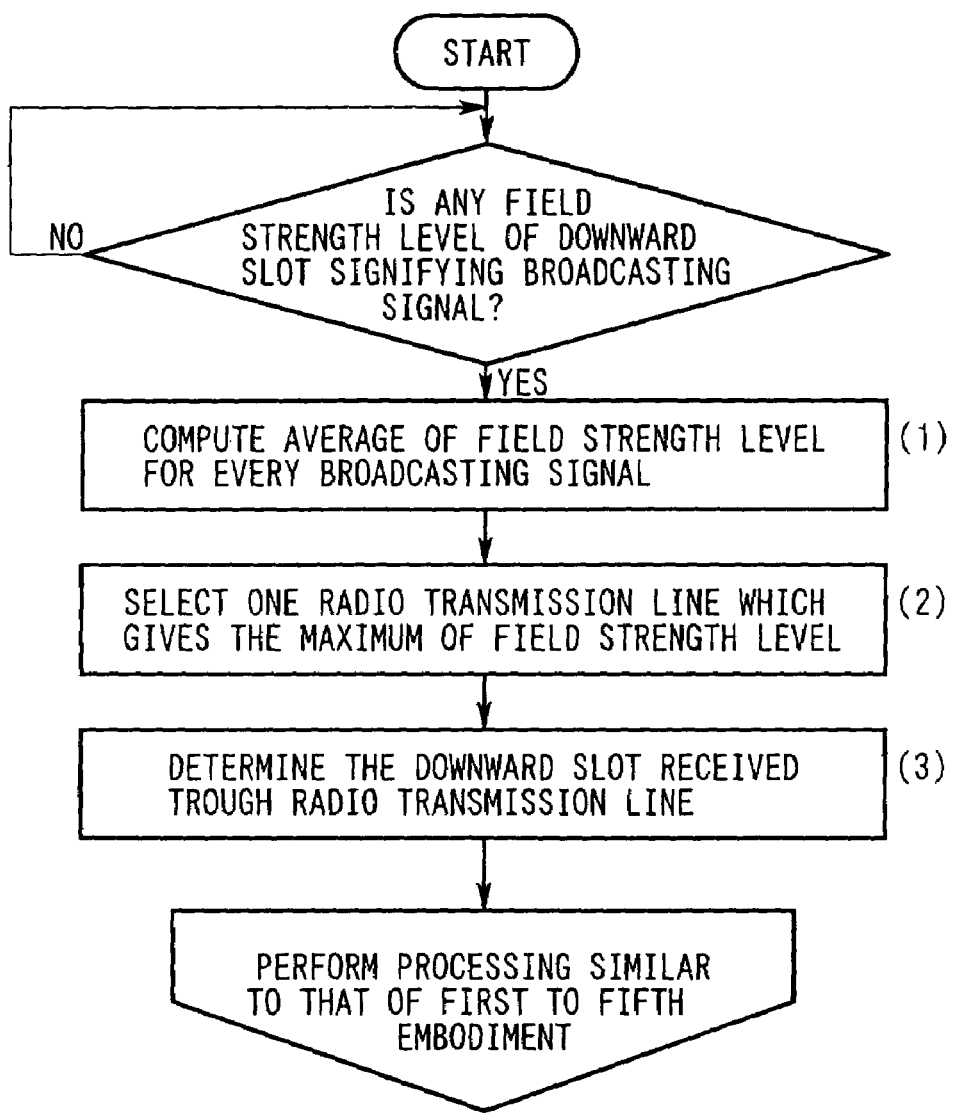
FIG. 7 is a flow chart showing the operations of the sixth embodiment of the present invention.

FIG. 7 is a flow chart of the operations of a sixth embodiment of the invention.

Figure 8:
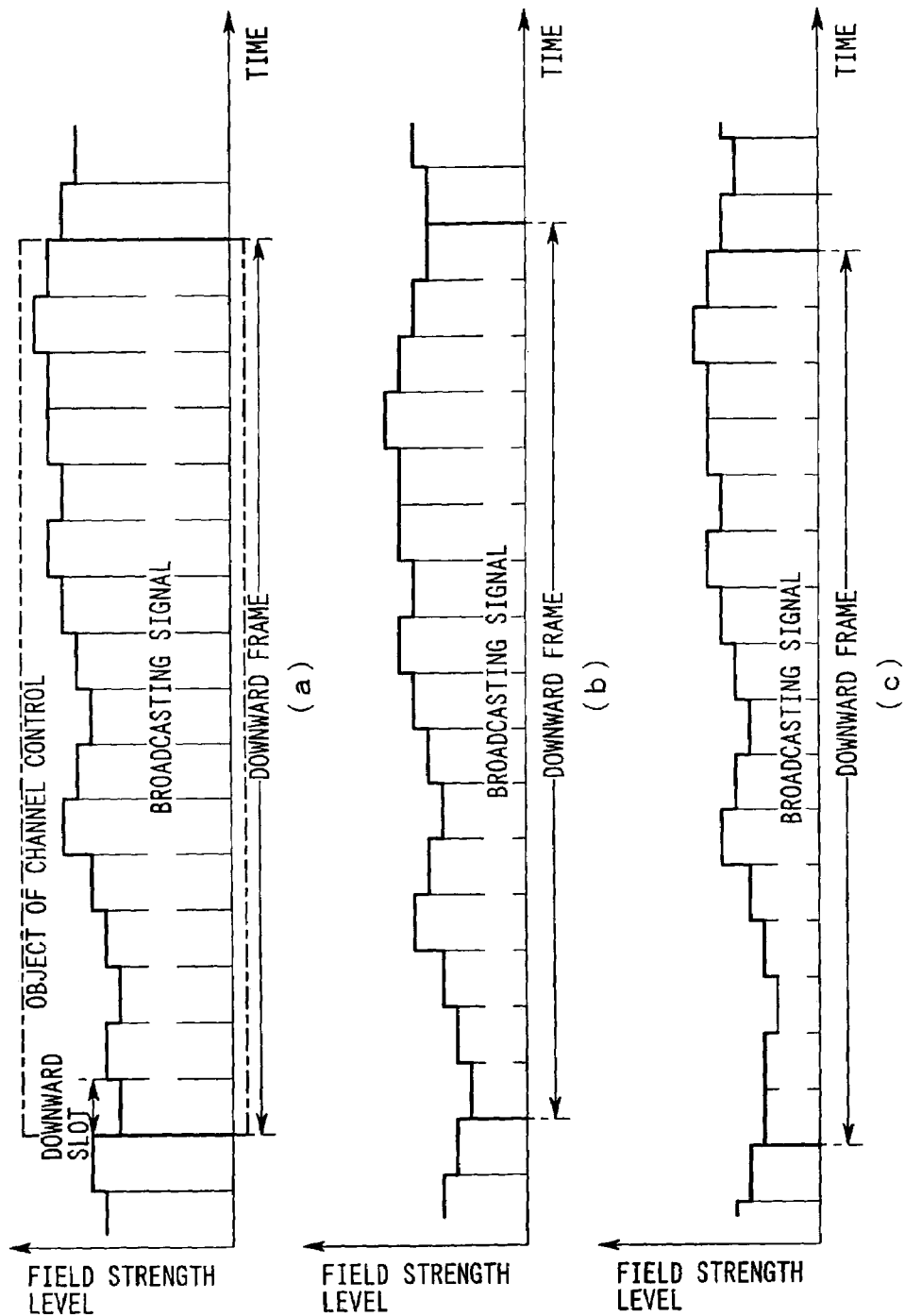
FIG. 8 is a diagram explaining the operations of the first embodiment of the present invention.

FIG. 8 is a diagram for explaining the operations of the sixth embodiment of the invention.

The operations of the sixth embodiment of the invention will be described with reference to FIG. 2, FIG. 7 and FIG. 8.

The difference of this embodiment from the foregoing first to fifth embodiments resides in the following processing procedure to be done by the CDMA controlling part 62-1 and in the operations of the individual parts to be performed under the control of the CDMA controlling part 62-1.

In the mobile station 61-1, during the period for searching the wireless zone in which the local station shifts to the standby state and the wireless zone to which the local station is to shift the hand-over process, for example, the receiving unit 87-1 receives the broadcasting signals (FIG. 8(*a*) to (*c*)) reached individually from the radio base stations 71-1 and 71-2, in parallel for every downward slots, and measures the field intensities of those downward slots.

On the other hand, those broadcasting signals are transmitted with constant transmission powers having nominal values known in the radio terminal equipment, by the radio base stations 71-1 and 71-2 but are not objects of the transmission power control.

The receiving timing detecting part 63-1 informs the CDMA controlling part 62-1 suitably of the field intensities of those broadcasting signals (or downward slots) while identifying them for every wireless zones (or radio base stations).

The CDMA controlling part 62-1 integrates (FIG. 7(1)) those field intensities in parallel for every wireless zones (or radio base stations) and selects (FIG. 7(2)) such one of the radio transmission lines formed between the radio base stations 71-1 and 71-2 as gives the maximum as the result of the integration.

Moreover, the CDMA controlling part 62-1 determines (FIG. 7(3)) the downward frame (containing the broadcasting signal) received through the radio transmission line thus selected, in conjunction with the receiving timing detecting part 63-1 and the receiving signal processing part 64-1 as well as the receiving part 87-1, the orthogonal demodulation part 88-1, the despreading part 89-1, the demodulation part 90-1, the transmission information generating part 83-1, the spreading part 84-1, the orthogonal modulation part 85-1 and the transmission part 86-1, and performs a processing similar to that of the foregoing first to fifth embodiments with reference to the leading or trailing point of the downward slots contained in the downward frame.

Specifically, the transmission point of the downward slot to be transmitted by the mobile station 61-1 according to the procedure of the channel control is highly accurately determined with reference to the downward slot which reached from such one of a plurality of radio base stations 71-1 and 71-2 as forms a radio transmission line having an favorable transmission quality.

According to this embodiment, therefore, it is possible to perform the channel control which is flexibly suited for the fluctuation in the transmission characteristics of the radio transmission line.

Here in the foregoing individual embodiments, the invention is applied to the mobile station that is the terminal of the mobile communication system to which a wide-band CDMA system is applied.

However, the invention should not be limited to the wide-band CDMA but can also be applied to a radio transmission system to which any multiple access system or modulation system is applied, as long as the radio terminal equipment receives the radio waves reached from a plurality of radio stations through a plurality of radio transmission lines having a difference in the delay time and processes the information given as the radio waves for any channel control.

In the foregoing individual embodiments, on the other hand, there is made the transmission power control which is effective for solving the near-far problem intrinsic to the CDMA system.

However, the invention can also be applied to a radio transmission system in which such transmission power control is not made.

In the foregoing individual embodiments, moreover, there is not disclosed the operation procedure to be applied to the decision of the transmission point. However, this operation procedure does not belong to the feature of the invention, but can be achieved by applying a variety of known techniques.

In the foregoing individual embodiments, on the other hand, the invention is applied to the radio transmission system to which a transmission unit such as the aforementioned frame is transmitted for a predetermined period through the radio transmission line.

However, if it is demanded that the transmission point to transmit a succeeding transmission unit is determined with reference to the point in time at which the transmission unit having reached antecedently at a different point in time is received, the invention can be applied to such radio transmission system in which the period is not constant.

In the foregoing individual embodiments, moreover, there is specified neither the system nor the procedure of the channel control applied. However, the invention can also be applied to a radio transmission system to which any channel control system or procedure is applied, even if the aforementioned watching time tw or transmission point is different according to the operating states of the system such as a traffic distribution and the wireless zone, radio channel or other factors to be accessed to by the radio terminal equipment according to the invention, as long as these factors are identified in the procedure of the channel control and if the watching time tw and other values are reliably given.

On the other hand, the invention should not be limited to the foregoing embodiments. Within the scope of the invention, embodiments of various modes can be made, and any improvement may be made some or all of the component parts.

What is claimed is:

1. A mobile station in a mobile communication system, comprising:
    a timing unit for determining, based upon a received downlink signal, timing for sending an uplink signal,
    a receiving unit for receiving a plurality of downlink signals from a plurality of base stations in a soft handoff mode with the mobile station, and
    a controller for determining a window of time for receiving downlink signals from the plurality of base stations, said controller determining the window of time based upon the determined timing for sending an uplink signal, wherein
    said controller controlling processing of downlink signals from the plurality of base stations such that only downlink signals having a receive timing during the window of time will be processed to affect an uplink signal.

2. A mobile station in a mobile communication system, comprising:
    a receiving unit for receiving a plurality of downlink signals from a plurality of base stations in a soft handoff mode with the mobile station,
    a timing unit for determining, based upon a received downlink signal of the plurality of downlink signals, timing for sending of an uplink signal,
    a controller for determining a window of time for receiving downlink signals from the plurality of base stations, said controller determining the window of time based upon the determined timing for sending an uplink signal or said received downlink signal, and said controller controlling the transmission of an uplink signal based upon only downlink signals from the plurality of base stations having a receive timing during the window of time.

3. The mobile station of claim 2, wherein said window of time ends prior to the next uplink signal to allow for a processing time required to generate the transmit power control for controlling the transmit power of a next uplink signal.

4. A mobile station in a mobile communication system, comprising:
    a timing unit for timing a sending of an uplink signal based on a received downlink signal of a plurality of downlink signals received from a plurality of base stations in a soft handoff mode with the mobile station,
    a controller for determining a window of time based upon the determined timing for sending an uplink signal and said controller controlling the transmission of an uplink signal based upon only downlink signals from the plurality of base stations having a receive timing during the window of time, wherein
    said controller controlling the transmit power of the uplink signal according to transmit power control data included in only downlink signals from the plurality of base stations having a receive timing during the window of time.

5. The mobile station of claim 4, further comprising:
    a measuring unit for measuring a quality of one or more of the received downlink signals, and
    a generating unit for generating transmit power control data according to only the quality of received signals which reach the generating unit a predetermined period earlier than timing of sending transmit power control data in a next uplink signal,
    wherein said predetermined period is for a processing time required to generate the transmit power control data.

6. A mobile station in a mobile communication system, comprising:
    a receiving unit for receiving transmission signals respectively transmitted in parallel from a plurality of base stations in the mobile communication system, said base stations in a soft handoff mode with said mobile station, a channel control unit for determining from at least one of said transmission signals a channel control timing for controlling the transmit timing from the mobile station and processing the received transmission signals and providing an output to affect a next uplink signal according to said channel control timing, and a processing unit for processing only transmission signals received during a window of time, said window of time determined based upon the channel control timing and is a predetermined time prior to sending of the next uplink signal, and providing a transmit power control of a next uplink signal based upon said processing.

7. A mobile station in a mobile communication system, comprising:

a channel control unit for determining from at least one downlink signal of a plurality of downlink signals received from a plurality of base stations in a soft handoff mode with the mobile station, a channel control timing for controlling the transmit timing from the mobile station, a controller for determining a window of time based upon the determined channel control timing, said window of time prior to sending a next uplink signal and processing received transmit power control data from downlink signals received during said window of time, a measuring unit for measuring a respective value of signal quality from one or more of a received plurality of downlink signals, and a generating unit for generating the transmit power control data to be included in a next uplink signal according to the measured value of signal quality of only respective downlink signals received a predetermined time prior to the timing of sending the next uplink signal according to the channel control, wherein said controller controlling the transmit power of the next uplink signal according to transmit power control data included in downlink signals from the plurality of base stations having a receive timing during the window of time.

8. The mobile station in claim 7 where the mobile station is simultaneously connected with the plurality of base stations via a plurality of radio channels and where the mobile station provides the transmit power control data useful in controlling the transmit power of the base stations, and where the predetermined period is determined from a minimum processing period for processing a downlink frame to provide transmit power control data to the base stations in a next uplink frame while maintaining channel timing control.

9. An electronic device in a mobile terminal of a mobile communication system, comprising:

a receiving unit for receiving transmission signals respectively transmitted in parallel from a plurality of base stations in the mobile communication system, said base stations in a soft handoff mode with said mobile station, a processing unit for processing one or more of said transmission signals, and a channel control unit for determining from at least one of said transmission signals a window of time during which data from only downlink signals from the plurality of base stations having a receive timing during the window of time will be utilized in generating and transmitting a next uplink signal to be transmitted to at least one base station of said plurality of base stations in said soft handoff mode, thereby providing transmit power control for the next uplink signal even if the receiving unit does not receive at least one of the plurality of transmission signals from a respective base station in soft handoff mode.

10. A radio terminal equipment comprising:

a receiving unit for receiving substantially in parallel a plurality of radio waves which may reach the receiving unit at deviating points in time, through a radio transmission path;

a channel controlling unit for processing only radio waves of said plurality of radio waves received by said receiving unit during a period of time according to a channel controlling procedure even if at least one of the plurality of radio waves is received after said period of time; and a transmission unit for transmitting to said radio transmission path a transmission wave signifying a response to any radio wave which is an object of said processing by said channel controlling unit; wherein said period of time ends a predetermined time prior to the sending of the response, said predetermined time is a period allowing for a length of time needed for executing processes required for said channel controlling procedure including controlling transmit power of the next uplink wave according to radio waves received during said period of time.

11. The radio terminal equipment as claimed in claim 10, wherein said period of time is a period given in advance to said channel controlling unit and is relative to an instant at which a specific one of said plurality of radio waves is received by said receiving unit.

12. The radio terminal equipment as claimed in claim 10, wherein:

said receiving unit obtains an individual time that each radio wave of said plurality of radio waves is received and measures a transmission quality for each of said plurality of radio waves;

said channel controlling unit determines an instant at which said transmission wave is to be transmitted, which is relative to a result of averaging the sum of products of said individual times each radio wave is received, and said transmission quality measured by said receiving unit from said any radio wave received during said period of time; and said transmission unit transmits said transmission wave(s) at said instant obtained by said channel controlling unit.

13. The radio terminal equipment as claimed in claim 11, wherein each of said plurality of radio waves reach said radio terminal equipment individually and sequentially in a cycle having a nearly equal nominal value, and said period of time given in advance is given as a subset of said cycle.

14. The radio terminal equipment as claimed in claim 11, wherein each radio wave of said plurality of radio waves comprises a plurality of frames that reach said radio terminal equipment individually and sequentially in a cycle having a nearly equal nominal value, and said period of time given in advance is given as a subset of a frame.

15. The radio terminal equipment as claimed in claim 12, wherein each of said plurality of radio waves reach said radio terminal equipment individually and sequentially in a cycle having a nearly equal nominal value, and said period of time given in advance is given as a subset of said cycle and is relative to timing for sending a response.

16. The radio terminal equipment as claimed in claim 11, wherein each of said plurality of radio waves reach said radio terminal equipment individually and sequentially in a common cycle having a nearly equal nominal value, and said period of time given in advance is a subset of each period from the earliest point in time, at which any one of said plurality of radio waves reach the receiving unit during a period in said cycle which precedes said period of time given as the subset of each period, to the latest instant at which any of a following said plurality of radio waves reach the receiving unit.

17. The radio terminal equipment as claimed in claim 12, wherein each of said plurality of radio waves reach said radio terminal equipment individually and sequentially in a common cycle having a nearly equal nominal value, and said period of time given in advance is a subset of each period from the earliest point in time, at which any one of said plurality of radio waves reach the receiving unit during a period in said cycle which precedes said period of time given as the subset of each period, to the latest instant at which any of a following said plurality of radio waves reach the receiving unit.

18. The radio terminal equipment as claimed in claim 10, wherein said channel controlling unit determines lengths of time needed for both said processing said radio waves received by said receiving unit and said processing to be done on responses transmitted by said transmission unit, wherein the processing done by said radio station connected through said radio transmission path includes processing one or more of said radio waves received during a period where said lengths of time needed for the processes are suitable for the system of said channel control.

19. The radio terminal equipment as claimed in claim 18, wherein at least one of said lengths of time needed for the processes to be done on said radio waves received by said receiving unit and/or said process done by said radio station connected through said radio transmission path to be done on said response transmitted by said transmission unit vary in accordance with an event which can be identified by said channel controlling unit while executing said channel control procedure, and said channel controlling unit determines said lengths of time needed for the processes in accordance with said event identified under said channel controlling procedure.

20. The radio terminal equipment as claimed in claim 18, wherein said channel controlling unit determines said lengths of time needed for the processes to be done on said radio wave received by said receiving unit under said channel controlling procedure with a level of accuracy which will compensate for at least one of a fall in the transmission rate of said radio transmission path and/or a deviation of said radio waves.

21. The radio terminal equipment as claimed in claim 10, wherein said channel controlling unit during the execution of said processing restricts the operation of composing elements to processing said radio waves received by said receiving unit under said channel controlling procedure, said composing elements including said receiving unit, said channel controlling unit, and said transmission unit.

22. The radio terminal equipment as claimed in claim 21, wherein said processing said radio waves received by said receiving unit under said channel controlling procedure by said composing elements includes processing to determine at least one of a period suitable for said transmission system of said radio transmission path and/or a starting point of said period.

23. The radio terminal equipment as claimed in claim 10, wherein each of said plurality of radio waves respectively reach said radio terminal equipment individually and sequentially in a cycle and contain control information on transmitting power control, and said channel controlling unit controls the transmitting power responsive to said control information included in a specific radio wave of said plurality of radio waves reached during a preceding period of time, through at least one of said receiving unit and said transmission unit.

24. The radio terminal equipment as claimed in claim 10, wherein said channel controlling unit monitors at least one of a transmission quality and a field strength level of a radio wave received by said receiving unit per wireless zone on the basis of zone configuration and channel allocation, and performs a channel control of a wireless zone which has the highest transmission quality.

25. The radio terminal equipment as claimed in claim 10, further comprising a demodulating unit for acquiring transmission information by one of demodulating at least part of said radio waves, which are the object of the processing by said channel controlling unit and by demodulating said radio waves under predetermined weighting.

26. The radio terminal equipment as claimed in claim 10, further comprising a demodulating unit for acquiring transmission information by one of demodulating at least part of said plurality of radio waves reached through said radio transmission path and received in parallel by said receiving unit, and by demodulating said radio waves under predetermined weighting.

27. The radio terminal equipment as claimed in claim 10, wherein said channel controlling unit determines an instant at which said transmission wave is to be transmitted to said radio transmission path, and said transmission unit transmits said transmission wave at said instant determined by said channel controlling unit.

28. The radio terminal equipment as claimed in claim 27, wherein said instant at which said transmission wave is to be transmitted to said radio transmission path fluctuates in accordance with events which can be identified by said channel controlling unit during said processing according to said channel control procedure, and said channel controlling unit obtains said instant at which said transmission wave is to be transmitted in accordance with said events identified under said channel controlling procedure.

29. A base station in a mobile communication system, for receiving an uplink signal from a mobile terminal in the communication system, comprising:

a receiving unit for receiving a transmit power control data generated by a mobile station according to a quality of one or more of a plurality of downlink signals received at said mobile station until a time which is a predetermined period earlier than a timing of sending the transmit power control signal from the mobile station even if the mobile station does not receive at least one of the plurality of downlink signals, thereby limiting the generation of the transmit power control data for a next uplink signal to downlink signals received prior to the predetermined period, and a transmit power control unit for controlling a transmit power control according to said transmit power control data, wherein the mobile station generates the transmit power control signal by receiving a plurality of radio waves from a plurality of base stations in a soft handoff mode with the mobile station which may reach the radio terminal equipment at deviating points in time, through a radio transmission path, the mobile station processing only radio waves of said plurality of radio waves having a deviation less than a window of time for receiving the downlink signals from the plurality of base stations, the window of time determined based upon timing for sending an uplink signal to maintain the channel control procedure, and transmitting to said radio transmission path a transmission wave signifying a response to only the radio waves which are an object of said processing, thereby limiting the a response to include only information processed from radio waves received during said window of time.

30. In a mobile radio terminal where transmit and receive timing is controlled by a channel control procedure, a method of transmitting a response to a received plurality of radio waves, comprising the steps of:
receiving substantially in parallel the plurality of radio waves which may reach the radio terminal equipment at deviating points in time, through a radio transmission path;
processing only radio waves of said plurality of radio waves having a deviation less than a window of time for receiving downlink signals from the plurality of base stations, the window of time determined based upon timing for sending an uplink signal to maintain the channel control procedure; and
transmitting to said radio transmission path a transmission wave signifying a response to only the radio waves which are an object of said processing, thereby limiting the a response to include only information processed from radio waves received during said window of time.

31. The method of claim 30, wherein
said channel control procedure includes processing to be done to said transmission wave(s) received by a radio station connected through said radio transmission path and which is also suitable for a transmission system in said radio transmission path.

32. The method of claim 30, further comprising the step of:
determining transmit power control of the response from only radio waves with receive timing during the window of time and the window of time is relative to a point in time at which a specific one of said plurality of radio waves is received.

33. The method of claim 30, further comprising the steps of:
determining an individual time that each radio wave of said plurality of radio waves is received;
measuring a transmission quality for one or more of said plurality of radio waves;
determining a transmission instant, which is a point where said transmission wave is to be transmitted, and is relative to a result of averaging the sum of products of said individual times and said transmission quality measured from said any radio wave received prior to said instant; and
said transmitting step transmits said transmission waves at said transmitting instant.

34. A method of processing a plurality of downlink signals in a wireless communications system where each downlink signal of said plurality comprises sequential frames and where transmit and receive timing is controlled by a channel control procedure, comprising the steps of:
receiving in parallel the plurality of radio waves which frames may reach the radio terminal equipment at deviating times, through a wireless communication channel from base stations in a soft handoff mode with the radio terminal equipment;
processing only frames of said plurality of radio waves having a deviation less than a window of time for receiving downlink signals from the plurality of base stations, the window of time determined based upon timing for sending an uplink signal in time to maintain the channel control procedure even if at least one of the plurality of radio waves has not yet been received; and
transmitting through a wireless communication channel an uplink signal signifying a response to said frame(s) which is an object of said processing, thereby limiting the response to include only information processed from radio waves received during said window of time.

35. The method of claim 34, wherein
said channel control procedure includes processing to be done to said uplink signal received by a radio station connected through said wireless communication channel and which is also suitable for a transmission in said wireless communication channel.

36. The method of claim 34, further comprising the step of:
determining transmit power control of the response from only radio waves with receive timing during the window of time and the window of time is relative to a point in time at which a specific one of said plurality of radio waves is received.

37. The method of claim 34, further comprising the steps of:
determining an individual time that each frame of said plurality of radio waves is received;
measuring a transmission quality for one or more of said plurality of radio waves;
determining a transmission instant, which is a point where said uplink signal is to be transmitted, and is relative to a result of averaging the sum of products of said individual times and said transmission quality measured from said any frame received prior to said instant; and
said transmitting step transmits said uplink signal at said transmitting instant.

38. A method of controlling transmit power of an uplink signal from a terminal in a communication system, the terminal capable of simultaneously receiving a plurality of frames in respective downlink signals from a plurality of bases stations in a soft handoff mode with said terminal, the frames in the respective downlink signals having a period of time during which information is contained that is useful in determining the transmit power of the frame of the uplink signal, comprising the steps of:
receiving a downlink signal,
determining from the downlink signal an uplink signal timing used in maintaining channel control in soft handoff mode when generating and transmitting the uplink signal, and
generating transmit power control data to control the transmit power of a next frame of an uplink signal, the generating starting at a time required to maintain the uplink signal timing, and the transmit power control data generated from only frames of data from respective downlink signals having said useful periods of time which are received during a window of time determined from the uplink signal timing, the window of time ending a predetermined time prior to the transmitting of the uplink window.

39. The method of claim 38, further comprising the steps of:
determining a minimum processing time required to generate the transmit power control data such that the transmit power control data can be included in an uplink signal, measuring a respective value of signal quality from one or more of a received plurality of downlink signals, and
generating the transmit power control data to be included in an uplink signal according to the measured value of signal quality of only respective downlink signals received prior to the start of the minimum processing time even if at least one of the plurality of downlink signals is not yet received prior to the start of the minimum processing period.

40. A method of controlling transmit power of an uplink signal from a terminal in a communication system, the terminal capable of simultaneously receiving a plurality downlink signals from a plurality of bases stations in a soft handoff mode with said terminal, comprising the steps of:
determining a period of time during which transmit power control data of a downlink signal must be received during, said period of time determined based on the receive timing of one of the downlink signals of the plurality of downlink signals, in order to maintain uplink channel control timing while controlling the transmit power in a next uplink frame, and
generating transmit power control data to control the transmit power of the next uplink frame from only the downlink signals having their respective receive timing during the determined period of time.

41. A method of controlling transmission powers in a wireless mobile communication system where a mobile station is simultaneously connected with a plurality of base stations via a plurality of radio channels and where the mobile station provides transmit power control data useful in controlling the transmit power of the base stations and the base stations provide transmit power control data useful in controlling the transmit power of the mobile station, comprising the steps of:
receiving a plurality of downlink signals from a plurality of base stations in a soft handoff mode with the mobile station;
determining, based upon a received downlink signal of the plurality of downlink signals, timing for sending of an uplink signal;
determining a window of time for receiving downlink signals from the plurality of base stations, said controller determining the window of time based upon the determined timing for sending an uplink signal and said controller controlling the transmission power of an uplink signal based upon only downlink signals from the plurality of base stations having a receive timing during the window of time;
determining a minimum processing period for processing a downlink frame to provide transmit power control data to the base stations in a next uplink frame while maintaining channel timing control,
measuring a value of signal quality for one or more of the plurality of radio channels, and
generating transmit power control data to be included in the next frame, from only the measured value of signal quality of respective radio channels received before the minimum processing period even if at least one of the plurality of downlink signals is not received prior to the start of the minimum processing period thereby limiting the generation of the transmit power control data.

42. A method of controlling a transmission power of a base station of a wireless communication system, comprising the steps of:
receiving in the base station an uplink signal containing transmission power control data,
determining from the transmission power control data a transmission power of a next downlink signal, and
transmitting the next downlink signal at a power level responsive to the determining step, wherein
generating the transmission power control data in a mobile terminal includes the steps of:
receiving a downlink signal in a terminal;
determining from the downlink signal an uplink signal timing required to maintain channel control when generating and transmitting an uplink signal;
determining a window of time which ends a predetermined time prior to sending the next uplink signal;
processing the downlink signal to provide a processing result when said downlink signal has a receive timing during the window of time;
measuring of a respective value of signal quality for one or more of a plurality of downlink signals;
generating transmit power control data to be included in the next uplink signal from only the downlink signals having their respective value of signal quality measured during a predetermined period of time even if at least one of the plurality of downlink signals is not received during the period of time during which the measuring must occur; and
generating an uplink signal to be transmitted according the determined uplink signal timing including the transmit power control data, the uplink signal transmit power controlled according to the downlink signal having a receive timing during the window of time.

43. A method of signal processing in a wireless communication system, comprising the steps of:
transmitting a downlink signal from a base station;
receiving a downlink signal in a terminal;
determining from the downlink signal an uplink signal timing required to maintain channel control when generating and transmitting an uplink signal;
determining a window of time which ends a predetermined time prior to sending a next uplink signal;
processing the downlink signal to provide a processing result when said downlink signal has a receive liming during the window of time; and
generating an uplink signal to be transmitted according the determined uplink signal timing, the uplink signal controlled according to the processing result from the downlink signal having a receive timing during the window of time.

44. A method of signal processing in a wireless communication system having a plurality of base stations in a soft handoff mode with a terminal, comprising the steps of:
transmitting a downlink signal from each base station of said plurality of base stations in said soft handoff mode;
receiving the transmitted downlink signals in the terminal;
determining from at least one of the downlink signals an uplink signal timing required to maintain channel control when generating and transmitting an uplink signal;

determining a window of time which ends a predetermined time prior to sending the next uplink signal;
processing one or more of the downlink signals having a receive timing during the window of time to provide a processing result for each downlink signal; and
generating an uplink signal, the uplink signal controlled according to the processing result from the downlink signals received during the window of time.

45. The method of claim 44 wherein the uplink signal has transmit power controlled according to the processing result from the downlink signals from the base stations in a soft handoff mode with the terminal received during the window of time.

* * * * *

UNITED STATES PATENT AND TRADEMARK OFFICE
CERTIFICATE OF CORRECTION

| | | |
|---|---|---|
| PATENT NO. | : 7,127,252 B1 | |
| APPLICATION NO. | : 09/510074 | |
| DATED | : October 24, 2006 | |
| INVENTOR(S) | : Nobuhisa Aoki et al. | |

It is certified that error appears in the above-identified patent and that said Letters Patent is hereby corrected as shown below:

Column 30, claim 43, line 51: "result when said downlink signal has a receive liming" should be changed to --result when said downlink signal has a receive timing--; and line 56, "downlink signal having a receive timing during the" should be changed to --downlink signal having the receive timing during the--.

Signed and Sealed this
Ninth Day of August, 2011

David J. Kappos
*Director of the United States Patent and Trademark Office*